United States Patent
Wang et al.

(10) Patent No.: US 11,281,479 B2
(45) Date of Patent: Mar. 22, 2022

(54) METHOD, APPARATUS AND COMPUTER READABLE STORAGE MEDIUM FOR PROVIDING CLOUD PLATFORM VIRTUAL ASSETS

(71) Applicant: Siemens Aktiengesellschaft, Munich (DE)

(72) Inventors: Qi Wang, Wuhan (CN); Yong Yuan, Beijing (CN); He Yu, Wuxi (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/954,274

(22) PCT Filed: Dec. 29, 2017

(86) PCT No.: PCT/CN2017/120193
§ 371 (c)(1),
(2) Date: Jun. 16, 2020

(87) PCT Pub. No.: WO2019/127481
PCT Pub. Date: Jul. 4, 2019

(65) Prior Publication Data
US 2021/0089335 A1    Mar. 25, 2021

(51) Int. Cl.
*G06F 9/455* (2018.01)
*G06F 9/50* (2006.01)
(Continued)

(52) U.S. Cl.
CPC ............ *G06F 9/455* (2013.01); *G06F 9/5077* (2013.01); *H04L 43/028* (2013.01); *H04L 43/04* (2013.01); *H04L 67/10* (2013.01); *H04L 67/38* (2013.01)

(58) Field of Classification Search
CPC ..... G06F 9/455; G06F 9/5077; H04L 43/028; H04L 43/04; H04L 67/10; H04L 67/38
See application file for complete search history.

(56) References Cited

U.S. PATENT DOCUMENTS

2013/0332603 A1   12/2013   Hutten
2017/0262460 A1    9/2017   Nordstrom et al.
(Continued)

OTHER PUBLICATIONS

Extended European Search Report dated May 3, 2021.

*Primary Examiner* — Kristie D Shingles
(74) *Attorney, Agent, or Firm* — Harness, Dickey & Pierce, P.L.C.

(57) ABSTRACT

Embodiments disclose a method, apparatus and a computer readable storage medium for providing cloud platform virtual assets. The method includes: generating virtual asset configuration information and a virtual asset model, and sending the virtual asset configuration information and the virtual asset model to a cloud platform; obtaining asset measurement data of a real device and obtaining asset simulation data from a simulation side of the real device, and filtering the asset measurement data and the asset simulation data based on the virtual asset configuration information provided by the cloud platform and sending the filtered data to the cloud platform; providing the virtual asset model and the filtered data from the cloud platform. The embodiments relate virtual digital world to the real physical world and seamlessly integrate the simulation data with the measurement data.

16 Claims, 11 Drawing Sheets

(51) Int. Cl.
    *H04L 43/028*     (2022.01)
    *H04L 43/04*     (2022.01)
    *H04L 67/10*     (2022.01)
    *H04L 67/131*     (2022.01)

(56) References Cited

U.S. PATENT DOCUMENTS

2018/0130260 A1*   5/2018   Schmirler ............. G06T 19/006
2019/0147655 A1*   5/2019   Galera ............... G05B 19/4061
                                                                             345/419

* cited by examiner

METHOD, APPARATUS AND COMPUTER READABLE STORAGE MEDIUM FOR PROVIDING CLOUD PLATFORM VIRTUAL ASSETS

PRIORITY STATEMENT

This application is the national phase under 35 U.S.C. § 371 of PCT International Application No. PCT/CN2017/120193 which has an International filing date of Dec. 29, 2017, which designated the United States of America, the entire contents of which are hereby incorporated herein by reference.

FIELD

Embodiments of the present application generally relate to cloud platform technologies, and more particularly, to a method, an apparatus and a computer readable storage medium for providing cloud platform virtual assets.

BACKGROUND

Turning to cloud computing is a major change that the industry is going to face. The emergence of various cloud platforms is one of the most important embodiments of this shift. A cloud platform allows developers either to put written procedures to run in the cloud, or to use the services provided in the cloud, or both.

Industrial cloud platform has begun to scale. Different organizations can control the connection of data on industrial cloud platforms and use third-party developer's analysis software. On the one hand, industrial cloud platforms facilitate a large number of developers and develop a variety of industrial-grade applications (APPs). Developers only need to focus on how to solve the problem, without having to care about how to obtain and connect the data. On the other hand, users as data custodians can use these APs for equipment management, operation and maintenance, etc.

In the assets management of the industrial cloud platform of the prior art, a large number of existing simulation devices are ignored without the existence of virtual variables, which leads to inaccurate asset models. In addition, in the prior art, various assets need to be manually configured on the industrial cloud platform, and the operation is cumbersome for equipment management, operation and maintenance, and the like.

SUMMARY

To solve the problems in the prior art, embodiments of the present invention provide method, an apparatus and a computer readable storage medium for providing cloud platform virtual assets. The technical solutions are as follows.

In one embodiment, a method for providing cloud platform virtual assets, comprising:

generating virtual asset configuration information and a virtual asset model, and sending the virtual asset configuration information and the virtual asset model to a cloud platform; obtaining asset measurement data of a real device and obtaining asset simulation data from a simulation side of the real device, and filtering the asset measurement data and the asset simulation data based on the virtual asset configuration information provided by the cloud platform and sending the filtered data to the cloud platform; providing the virtual asset model and the filtered data from the cloud platform.

It can be seen that, in the embodiments of the present invention, the cloud platform can provide the virtual asset data by acquiring the asset simulation data and the asset measurement data, improve the accuracy of the asset model and enrich the cloud platform asset. Moreover, assets can be automatically configured through the virtual asset configuration information to avoid the tedious manual configuration. In addition, the virtual asset model and filtered data can be accessed and queried by the application to perform various analysis tasks and improve the functionality of the application.

In one embodiment, wherein generating virtual asset configuration information and a virtual asset model comprises: obtaining a simulation model from a simulation side of the real device; obtaining a first instance model from an automation side of the real device; obtaining a second instance model from a field installation of the real device; generating the virtual asset configuration information and the virtual asset model based on the simulation model, the first instance model and the second instance model.

Therefore, the virtual asset configuration information and the virtual asset model can be generated from multiple information sources, and the embodiments of the present invention have a wide range of applicability.

In one embodiment, wherein obtaining a simulation model from a simulation side of the real device comprises: obtaining context information of a data source from a product lifecycle management simulation software of the real device; or wherein obtaining a first instance model from an automation side of the real device comprises: obtaining control logic information from an automation software of the real device; or wherein obtaining a second instance model from a field installation of the real device comprises: generating context information of a data source via a modeling tool based on observation of a live installation process of the real device.

It can be seen that the simulation model, the first instance model, and the second instance model can have multiple sources of information, and the embodiments of the present invention have a wide range of applicability.

In one embodiment, wherein obtaining asset measurement data of a real device comprises: performing a measurement on the real device at the site of the real device to obtain the asset measurement data of the real device; or obtaining asset measurement data of the real device from a cloud.

Therefore, the asset measurement data according to the embodiments of the present invention may come from the real device site, but also from the cloud, and come in various source forms.

In one embodiment, wherein obtaining asset simulation data from a simulation side of the real device comprises: enabling a simulation data acquisition service deployed at the site of the real device to retrieve the asset simulation data from a simulation side deployed at the site; or, enabling a simulation data acquisition service deployed in the cloud to retrieve the asset simulation data from a simulation side deployed in the cloud.

It can be seen that the asset simulation data can be obtained directly from the simulation side employed in the field through the simulation data acquisition service employed on the real device site and can also be obtained from the simulation side employed in the cloud through the simulation data acquisition service employed in the cloud Therefore, the embodiments of the present invention have various implementation forms.

In one embodiment, wherein enabling a simulation data acquisition service deployed at the site of the real device to retrieve the asset simulation data from a simulation side deployed at the site comprises: performing a measurement on the real device at the site of the real device to obtain asset measurement data of the real device; sending the asset measurement data to the simulation data acquisition service deployed at the site of the real device; enabling the simulation data acquisition service deployed at the site of the real device to acquire the asset simulation data from a simulation side deployed at the site based on the asset measurement data.

It can be seen that the asset simulation data is obtained from the simulation side employed in the field based on the asset measurement data by performing measurement on the real device directly in the field to obtain the asset measurement data of the real device and by the on-site simulation data acquisition service. Therefore, both the measurement work and the acquisition of the asset simulation data can be performed on site, so that the information needed for the scene can be quickly obtained.

In one embodiment, wherein enabling the simulation data acquisition service deployed at the site of the real device to acquire the asset simulation data from a simulation side deployed at the site based on the asset measurement data comprises: enabling the simulation side deployed at the site to generate a FMU and send the FMU to the simulation data acquisition service deployed at the site of the real device; inputting the asset measurement data to the FMU in the simulation data acquisition service to generate the asset simulation data.

Therefore, the on-site simulation data acquisition service can generate asset simulation data through the FMU.

In one embodiment, wherein enabling the simulation data acquisition service deployed at the site of the real device to acquire the asset simulation data from a simulation side deployed at the site based on the asset measurement data comprises: enabling the simulation data acquisition service to send the asset measurement data to the simulation side deployed at the site; enabling the simulation side deployed at the site to generate the asset simulation data based on the asset measurement data and to send the asset simulation data to the simulation data acquisition service.

Therefore, the on-site simulation data acquisition service can directly obtain the asset simulation data from the simulation side.

In one embodiment, wherein enabling a simulation data acquisition service deployed in the cloud to retrieve the asset simulation data from a simulation side deployed in the cloud comprises: enabling a simulation data acquisition service deployed in the cloud to obtain the asset measurement data from the cloud; enabling the simulation data acquisition service deployed in the cloud to obtain the asset simulation data from a simulation side deployed in the cloud based on the asset measurement data.

It can be seen that the simulation data acquisition service employed in the cloud can obtain the asset measurement data from the cloud and obtain the asset simulation data from the simulation side of the cloud based on the asset measurement data. As a result, asset simulation data is captured directly in the cloud without the need to perform measurements, thereby providing data acquisition efficiency.

In one embodiment, wherein enabling the simulation data acquisition service deployed in the cloud to obtain the asset simulation data from a simulation side deployed in the cloud based on the asset measurement data comprises: enabling the simulation data acquisition service deployed in the cloud to send the asset measurement data to a simulation side deployed in the cloud; enabling the simulation side deployed in the cloud to generate the asset simulation data based on the asset measurement data and to send the asset simulation data to the simulation data acquisition service.

Therefore, the cloud simulation data acquisition service can obtain asset simulation data directly from the simulation side.

In one embodiment, wherein enabling the simulation data acquisition service deployed in the cloud to obtain the asset simulation data from a simulation side deployed in the cloud based on the asset measurement data comprises: enabling the simulation side deployed in the cloud to generate a FMU and send the FMU to the simulation data acquisition service; inputting the asset measurement data to the FMU in the simulation data acquisition service to generate the asset simulation data.

Therefore, the cloud simulation data acquisition service can generate asset simulation data through the FMU.

In one embodiment, wherein the virtual asset configuration information comprising one or more matching conditions and wherein filtering the asset measurement data and the asset simulation data comprises: matching the asset measurement data and the asset simulation data with the matching conditions respectively, and determining the data that meets the matching conditions as the filtered data.

Therefore, the source measurement data and the asset simulation data can be filtered through matching conditions to ensure that the filtered data meets the expectation.

In one embodiment, an apparatus for providing cloud platform virtual assets, comprising: a virtual asset configuration information and virtual asset generating module, configured to generate virtual asset configuration information and a virtual asset model, and send the virtual asset configuration information and the virtual asset model to a cloud platform; a filtering module, configured to obtain asset measurement data of a real device and obtain asset simulation data from a simulation side of the real device, and filter the asset measurement data and the asset simulation data based on the virtual asset configuration information provided by the cloud platform and send the filtered data to the cloud platform; and a providing module, configured to provide the virtual asset model and the filtered data from the cloud platform.

It can be seen that, in the embodiments of the present invention, the cloud platform can provide the virtual asset data by acquiring the asset simulation data and the asset measurement data, improve the accuracy of the asset model and enrich the cloud platform asset. Moreover, assets can be automatically configured through the virtual asset configuration information to avoid the tedious manual configuration. In addition, the virtual asset model and filtered data can be accessed and queried by the application to perform various analysis tasks and improve the functionality of the application.

In one embodiment, wherein the virtual asset configuration information and virtual asset generating module, configured to obtain a simulation model from a simulation side of the real device, to obtain a first instance model from an automation side of the real device, to obtain a second instance model from a field installation of the real device, and to generate the virtual asset configuration information and the virtual asset model based on the simulation model, the first instance model and the second instance model.

Therefore, the virtual asset configuration information and the virtual asset model can be generated from multiple information sources, and the embodiments of the present invention have a wide range of applicability.

In one embodiment, wherein to obtain a simulation model from a simulation side of the real device comprises: to obtain context information of a data source from a product lifecycle management simulation software of the real device; or wherein to obtain a first instance model from an automation side of the real device comprises: to obtain control logic information from an automation software of the real device; or wherein to obtain a second instance model from a field installation of the real device comprises: generating context information of a data source via a modeling tool based on observation of a live installation process of the real device.

It can be seen that the simulation model, the first instance model, and the second instance model can have multiple sources of information, and the embodiments of the present invention have a wide range of applicability.

In one embodiment, wherein the filtering module, configured to perform a measurement on the real device at the site of the real device to obtain the asset measurement data of the real device; or configured to obtain asset measurement data of the real device (20) from a cloud.

Therefore, the asset measurement data according to the embodiments of the present invention may come from the real device site, but also from the cloud, and come in various source forms.

In one embodiment, wherein to obtain asset simulation data from a simulation side of the real device comprises: enabling a simulation data acquisition service deployed at the site of the real device to retrieve the asset simulation data from a simulation side deployed at the site; or, enabling a simulation data acquisition service deployed in the cloud to retrieve the asset simulation data from a simulation side deployed in the cloud.

It can be seen that the asset simulation data can be obtained directly from the simulation side employed in the field through the simulation data acquisition service employed on the real device site and can also be obtained from the simulation side employed in the cloud through the simulation data acquisition service employed in the cloud Therefore, the embodiments of the present invention have various implementation forms.

In one embodiment, wherein to enable a simulation data acquisition service deployed at the site of the real device to retrieve the asset simulation data from a simulation side deployed at the site comprises: performing a measurement on the real device at the site of the real device to obtain asset measurement data of the real device; sending the asset measurement data to the simulation data acquisition service deployed at the site of the real device; enabling the simulation data acquisition service deployed at the site of the real device to acquire the asset simulation data from a simulation side deployed at the site based on the asset measurement data.

It can be seen that the asset simulation data is obtained from the simulation side employed in the field based on the asset measurement data by performing measurement on the real device directly in the field to obtain the asset measurement data of the real device and by the on-site simulation data acquisition service. Therefore, both the measurement work and the acquisition of the asset simulation data can be performed on site, so that the information needed for the scene can be quickly obtained.

In one embodiment, wherein enabling the simulation data acquisition service deployed at the site of the real device to acquire the asset simulation data from a simulation side deployed at the site based on the asset measurement data comprises: enabling the simulation side deployed at the site to generate a FMU and send the FMU to the simulation data acquisition service deployed at the site of the real device; inputting the asset measurement data to the FMU in the simulation data acquisition service to generate the asset simulation data.

Therefore, the on-site simulation data acquisition service can generate asset simulation data through the FMU.

In one embodiment, wherein enabling the simulation data acquisition service deployed at the site of the real device to acquire the asset simulation data from a simulation side deployed at the site based on the asset measurement data comprises: enabling the simulation data acquisition service to send the asset measurement data to the simulation side deployed at the site; enabling the simulation side deployed at the site to generate the asset simulation data based on the asset measurement data and to send the asset simulation data to the simulation data acquisition service.

Therefore, the on-site simulation data acquisition service can directly obtain the asset simulation data from the simulation side.

In one embodiment, wherein enabling a simulation data acquisition service deployed in the cloud to retrieve the asset simulation data from a simulation side deployed in the cloud comprises: enabling a simulation data acquisition service deployed in the cloud to obtain the asset measurement data from the cloud; enabling the simulation data acquisition service deployed in the cloud to obtain the asset simulation data from a simulation side deployed in the cloud based on the asset measurement data.

It can be seen that the simulation data acquisition service employed in the cloud can obtain the asset measurement data from the cloud and obtain the asset simulation data from the simulation side of the cloud based on the asset measurement data. As a result, asset simulation data is captured directly in the cloud without the need to perform measurements, thereby providing data acquisition efficiency.

In one embodiment, wherein enabling the simulation data acquisition service deployed in the cloud to obtain the asset simulation data from a simulation side deployed in the cloud based on the asset measurement data comprises: enabling the simulation data acquisition service deployed in the cloud to send the asset measurement data to a simulation side deployed in the cloud; enabling the simulation side deployed in the cloud to generate the asset simulation data based on the asset measurement data and to send the asset simulation data to the simulation data acquisition service.

Therefore, the cloud simulation data acquisition service can obtain asset simulation data directly from the simulation side.

In one embodiment, wherein enabling the simulation data acquisition service deployed in the cloud to obtain the asset simulation data from a simulation side deployed in the cloud based on the asset measurement data comprises: enabling the simulation side deployed in the cloud to generate a FMU and send the FMU the simulation data acquisition service; inputting the asset measurement data to the FMU in the simulation data acquisition service to generate the asset simulation data.

Therefore, the cloud simulation data acquisition service can generate asset simulation data through the FMU.

In one embodiment, wherein the virtual asset configuration information comprising one or more matching conditions and wherein filtering the asset measurement data and the asset simulation data comprises: matching the asset measurement data and the asset simulation data with the matching conditions respectively, and determining the data that meets the matching conditions as the filtered data.

Therefore, the source measurement data and the asset simulation data can be filtered through matching conditions to ensure that the filtered data meets the expectation.

In one embodiment, a computer-readable medium comprising computer instructions stored thereon, upon executing the computer instructions by a processor, the processor performing the method for providing cloud platform virtual assets described above.

BRIEF DESCRIPTION OF THE DRAWINGS

In order to make technical solutions of examples of the present disclosure clearer, accompanying drawings to be used in description of the examples will be simply introduced hereinafter. Obviously, the accompanying drawings to be described hereinafter are only some examples of the present invention. Those skilled in the art may obtain other drawings according to these accompanying drawings without creative labor.

LIST OF REFERENCE NUMBERS

Figure 1:
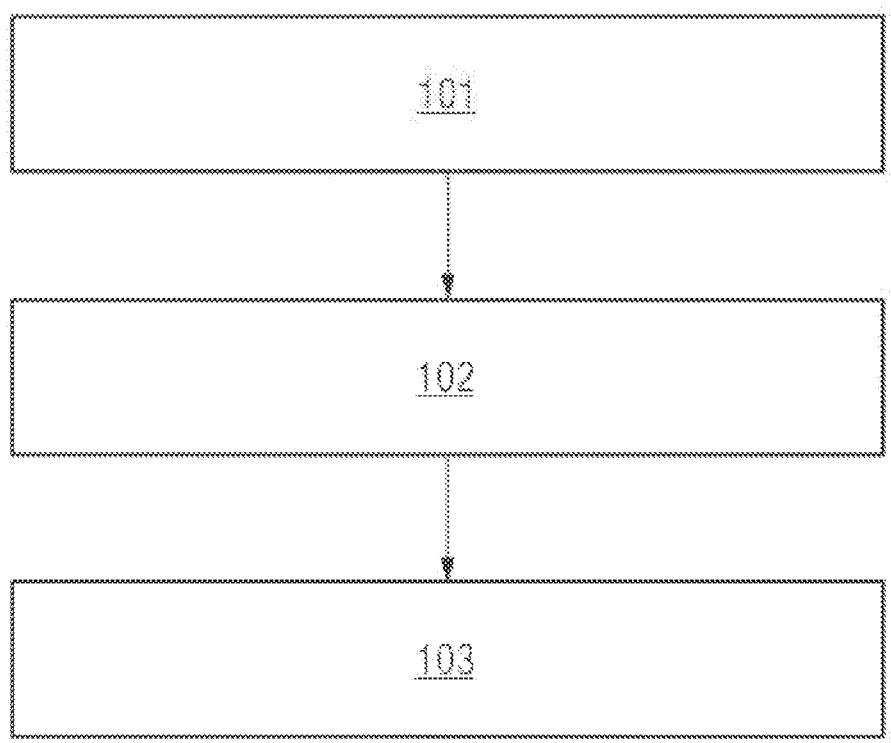
FIG. 1 is a flowchart of a method for providing cloud platform virtual assets according to an embodiment of the present invention.

| reference numbers | meanings |
| --- | --- |
| 101~103 | steps |
| 20 | real device |
| 30 | site |
| 31 | cloud |

-continued

| reference numbers | meanings |
| --- | --- |
| 32 | cloud platform |
| 33 | APP |
| 10 | asset model integration tool |
| 11 | virtual asset model |
| 12 | virtual asset configuration information |
| 13 | Cloud simulation software |
| 14 | Cloud automation software |
| 15 | live installation process |
| 16 | field virtual asset gateway |
| 17 | field simulation data acquisition service |
| 18 | measurement data service |
| 19 | field simulation software |
| 21 | cloud simulation data acquisition service |
| 22 | cloud simulation software |
| 23 | cloud virtual asset gateway |
| 191 | FMU |
| 601~606 | steps |
| 701~713 | steps |
| 801~812 | steps |
| 901~915 | steps |
| 1001~1014 | steps |
| 40 | asset model integration tool |
| 41 | virtual asset configuration information |
| 42 | virtual asset model |
| 411 | first matching condition |
| 412 | second matching condition |
| 43 | cloud |
| 44 | cloud gateway |
| 46 | vehicle assembly field device |
| 47 | vehicle assembly simulation device |
| 48 | simulation data service |
| 50 | apparatus for providing cloud platform virtual assets |
| 51 | virtual asset configuration information and virtual asset generating module |
| 52 | filtering module |
| 53 | providing module |

DETAILED DESCRIPTION OF THE EXAMPLE EMBODIMENTS

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure embodiments of the examples. As used herein, the term "includes" means includes but not limited to, the term "including" means including but not limited to. The term "based on" means based at least in part on. In addition, the terms "a" and "an" are intended to denote at least one of a particular element.

Applicants have found that in addition to data from physical assets, data from other virtual sources can also be considered as part of the asset model. Consolidating data from simulation and measurement is useful for applications in the application platform (eg, MindApps). For example, these applications may include control performance analysis applications or powertrain analysis applications, among others.

In embodiments of the present invention, virtual assets are consolidated into a cloud platform (such as MindSphere) based on the concept of digital twinning. This application provides a way to integrate the data from the simulation. To connect the virtual digital world to the real physical world, the virtual asset model can be parsed from lifecycle management (PLM) simulations or from various portals such as the TIA portal, allowing simulation data and measurement data to be seamlessly integrated. Moreover, applications in the application platform (for example, MindApps) can also use a common asset semantic model to perform various analysis tasks.

FIG. 1 is a flowchart of a method for providing cloud platform virtual assets according to an embodiment of the present invention.

As shown in FIG. 1, the method includes:

Step 101: generating virtual asset configuration information and a virtual asset model, and sending the virtual asset configuration information and the virtual asset model to the cloud platform.

Herein, generating the virtual asset configuration information and the virtual asset model includes: obtaining the simulation model from a simulation side of the real device; obtaining a first instance model from an automation side of the real device; obtaining a second instance model from a field installation of the real device. The virtual asset configuration information and virtual asset model is generated based on the simulation model, the first instance model, and the second instance model.

The simulation side of the real device is a virtual device (software) that simulates the real device. The simulation side of the real device mainly refers to PLM simulation software in different areas, such as LMS or Process Simulate and so on. From the PLM simulation software, we can extract the context information of data sources such as production line settings and mechanical relationships as the simulation model. The automation side of the real device mainly refers to software used in the automation system of the real device, such as TIA Portal or PCS7. Which, PCS7 is a DCS system, based on process automation, from sensors, actuators to the controller, and then to the host computer, bottom-up from the formation of a complete TIA architecture. Mainly include software such as Step7, CFC, SFC, Simatic Net and WinCC and PDM, the configuration object chooses S7-400 high-end CPU. From this automation software, control logic information can be obtained as a first instance model to enrich contextual information. Some modeling tools can also be used to generate context information of data sources based on the field engineer's observations of on-site installation of the real device, modeling the context information as a second instance model.

Based on the simulation model, the first instance model and the second instance model to generate virtual asset configuration information and a virtual asset model. The virtual asset model can use some semantic languages to describe the context information, and the virtual asset configuration information can be used to guide the implementation of data acquisition screening. A virtual asset model is a semantic model that contains information about assets, embodiments, variables, and relationships between these assets. The semantic model can be accessed and queried by the application to perform various analytical tasks.

For example, a virtual asset model can contain the topology of an industrial site, such as the connection between sensors, motors, rails, and other nodes. Also, the virtual asset configuration information may contain one or more matching conditions. Each match condition can include filter parameters such as node ID, sensor address, or parameter type. We can save the virtual asset model and virtual asset configuration information to the cloud platform.

Step 102: obtaining the asset measurement data of the real device and obtain the asset simulation data from the simulation side of the real device, filtering the data from the asset measurement data and the asset simulation data based on the virtual asset configuration information provided by the cloud platform, and sending the filtered data to cloud platform.

In one embodiment, measurements may be performed on the real device at the real device's site to obtain real-world asset measurement data. Optionally, we can also obtain the real device asset measurement data from the cloud.

In one embodiment, a simulation data acquisition service employed onsite of a real device may be enabled to obtain asset simulation data from a simulation side employed at the site. Optionally, the simulation data acquisition service employed in the cloud may also be enabled to obtain the asset simulation data from the simulation side employed in the cloud.

Preferably, enabling the simulation data obtaining service employed on the scene of the real device to obtain the asset simulation data from the simulation object employed in the field comprises: performing measurement on the real device in the field of the real device to obtain asset measurement data of the real device; Sending the asset measurement data to a simulation data acquisition service employed on the scene of the real device; the simulation data acquisition service employed on-site of the real device acquires the asset simulation data from the simulation-side employed at the site based on the asset measurement data.

Wherein the simulation data acquisition service employed in the field of the real device acquires the asset simulation data from the simulation side employed in the field based on the asset measurement data may include the following ways:

(1) The simulation side employed in the field generates a functional mockup unit (FMU) which sends the FMU to the on-site simulation data acquisition service; the asset measurement data is input to the functional model unit in the simulation data acquisition service, To generate asset simulation data.

(2) The on-site simulation data acquisition service sends the asset measurement data to the simulation side employed on site; the simulation side employed on site generates asset simulation data based on the asset measurement data and sends the asset simulation data to the on-site Simulation data acquisition service.

Preferably, enabling the simulation data acquisition service employed in the cloud to obtain the asset simulation data from the simulation side employed in the cloud includes: obtaining, by the simulation data acquisition service employed in the cloud, asset measurement data from the cloud; and sending, by the simulation data acquisition service employed in the cloud Asset simulation data is obtained from the simulation side employed in the cloud based on the asset measurement data.

Wherein the obtaining, by the simulation data acquisition service employed in the cloud, the asset simulation data from the simulation side employed in the cloud based on the asset measurement data may include the following ways:

(1) the simulation data acquisition service employed in the cloud sends the asset measurement data to the simulation side employed in the cloud; the simulation side employed in the cloud generates asset simulation data based on the asset measurement data and sends the asset simulation data to the cloud-based Simulation data acquisition service.

(2) The simulation side employed in the cloud generates the FMU, sends the FMU to the simulation data acquisition service employed in the cloud, and inputs the asset measurement data to the FMU in the simulation data acquisition service employed in the cloud to generate the asset simulation data.

Preferably, the virtual asset configuration information includes one or more matching conditions; and the selecting data from the asset measurement data and the asset simulation data in step 102 includes: matching the asset measurement data and the asset simulation data respectively with the matching condition, and matching the match Condition data as filtered data. Specifically, the filtered data type may belong to the asset measurement data or the asset simulation data.

For example, if the node ID included in the matching condition is PSA1 and the sensor address is DB1.12.0, the data with node ID PSA1 and sensor address DB1.12.0 is selected from the asset measurement data, and the data with node ID PSA1 and sensor address DB1.12.0 is selected from the asset simulation data.

For another example, assuming that the matching condition includes the node ID PSA1 and the FMU address is AMESIM FMU and the parameter type is position, the location data with the ID PSA1 and the AMESIM FMU is filtered out from the asset measurement and the asset simulation data.

The foregoing describes example examples of data selection based on virtual asset configuration information. Those skilled in the art may appreciate that such description is merely example and is not intended to limit the scope of protection of the embodiments of the present invention.

Step 103: providing the virtual asset model and the filtered data from the cloud platform.

Here, the cloud platform can provide virtual asset models and filtered data to various recipients, such as applications in the cloud platform. For example, applications can control performance analysis; drive train analysis based on virtual asset models and filtered data, which will enrich the functionality of the application.

Based on the flow shown in FIG. 1, an example architecture for providing cloud platform virtual assets according to an embodiment of the present invention is described below.

Figure 2:
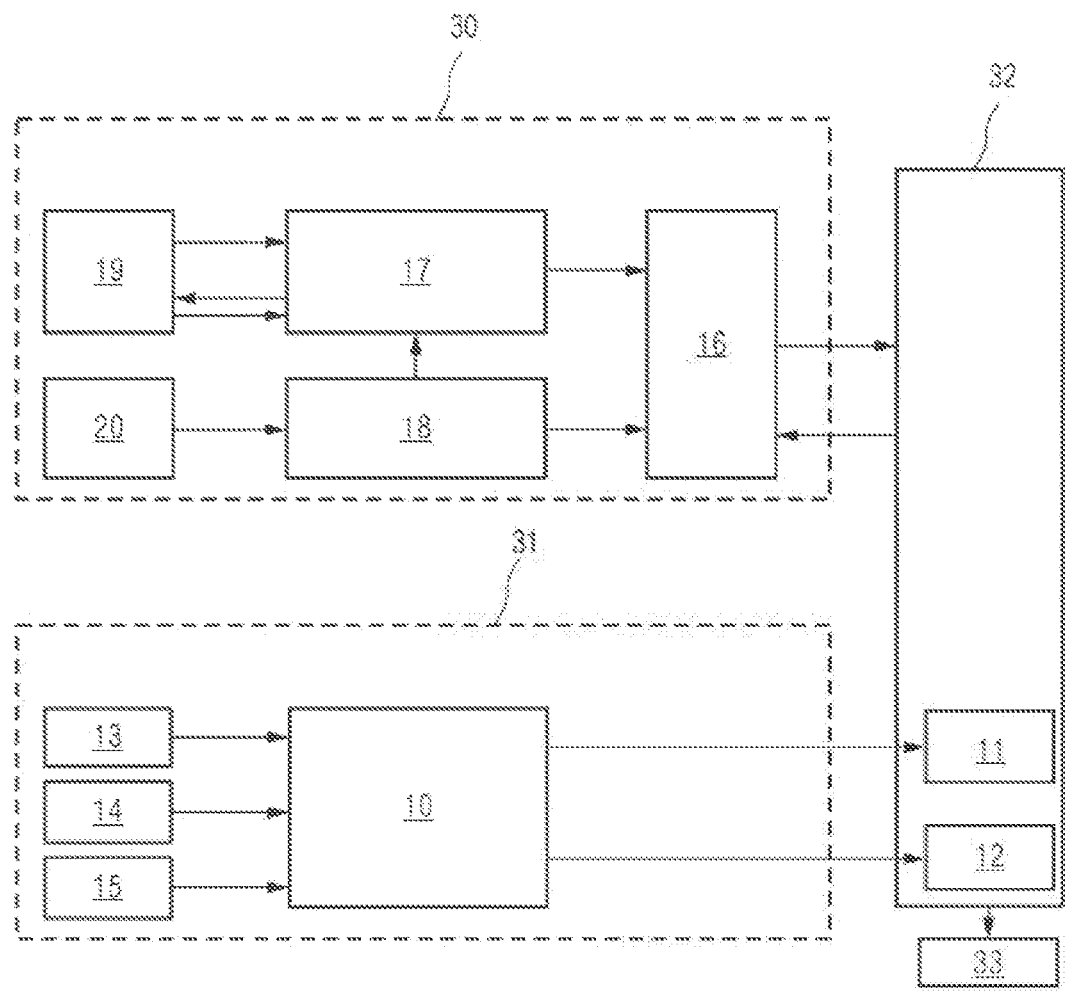
FIG. 2 is a first example architecture diagram of providing cloud platform virtual assets according to an embodiment of the present invention.

FIG. 2 is a first example architecture diagram of providing cloud platform virtual assets according to an embodiment of the present invention. FIG. In the example architecture shown in FIG. 2, the asset measurement data of the real device 20 is acquired at the site 30 of the real device 20.

In FIG. 2, the asset model integration tool 10 is employed in the cloud 31. The basic function of the asset model integration tool 10 is to integrate the cloud simulation software 13 located in the cloud 31 and the cloud automation software 14 located in the cloud 31 to generate a unified cloud semantic virtual asset model and virtual asset configuration information. The cloud simulation software 13 is simulation software that executes simulation on the real device 20, and the cloud automation software 14 is automation software of the real device 20.

The input of the asset model integration tool 10 includes: a) Cloud simulation software 13: mainly refers to PLM simulation software in different fields, such as LMS, Process Simulate, etc. The asset model integration tool 10 can extract data of production line settings, mechanical relationships, etc. from the simulation software Source context information software; b) cloud automation software 14: mainly refers to the software used in the automation system, such as TIA portal, PCS7, etc. In these automation software, the asset model integration tool 10 can obtain control logic information to enrich the context information; c) Site Installation 15. Asset Model Integration Tools 10 Modeling tools are also available to model contextual information based on the field engineer's observations of onsite settings, which can also be used to enrich onsite contextual information.

The output of the module of the asset model integration tool 10 includes: a) a virtual asset model 11 that can describe the contextual information in some semantic languages; b) virtual asset configuration information 12 that can guide the execution of data acquisition for the field virtual asset gateway 16.

The virtual asset model 11 and the virtual asset configuration information 12 output by the asset model integration tool 10 are stored in the cloud platform 32. Further, the cloud platform 32 sends the virtual asset configuration information 12 to the field virtual asset gateway 16.

In FIG. 2, the on-site simulation software 19, the real device 20, the on-site simulation data acquisition service 17, the measurement data service 18 and the on-field virtual asset gateway 16 are employed in the site environment 30 where the real device 20 is located.

In the field simulation software 19, a model of the real device 20 is constructed, and experiments are performed on the model to evaluate various operation strategies of the real device 20. The model of the real device 20 may be a generalized model, including a mathematical model, a physical model, and the like. Obviously, depending on the model of the real device 20, the on-site simulation software 19 has different simulations. The real device 20 may be implemented as a continuous-time system and a discrete-time system. Correspondingly, the simulation methods of the on-site simulation software 19 are also different, corresponding to the continuous-time system simulation and the discrete-time system simulation, respectively.

The measurement data service 18 may obtain the asset measurement data by performing measurements on the real device 20 and send the asset measurement data to the field simulation data acquisition service 17 and the field virtual asset gateway 16, respectively. The measurement data service 18 preferably includes data services in an automation system such as a PLC, an OPC UA server, etc. which can be connected to sensors in the real device 20 and transmit the asset measurement data to the rest of the system.

The purpose of the field simulation data acquisition service 17 is to provide data services to the field simulation software 19 which provide an interface to the time series simulation data. The field simulation data acquisition service 17 acquires the asset measurement data from the measurement data service 18 (eg PLC.OPC UA server). Moreover, the input of the field simulation data acquisition service 17 also includes the output of the field simulation software 19 (PLM simulation software such as LMS Amesim, Process Simulate). The output of the field simulation data acquisition service 17 is simulation data. For example, the live simulation data acquisition service 17 provides data calculated based on the asset measurement data in the field simulation software 19 as asset simulation data, which can be accessed by other partial systems.

For example, asset simulation data may be generated using the output of the field simulation software 19 according to following approaches.

In the first approach, the field simulation software 19 generates the FMU. Some PLM software, such as LMS Amesim, can generate the FMU, a library of variables that contains lists of variables, simulation models, and standard interfaces. The live simulation data acquisition service 17 may use this library file to generate asset simulation data. Specifically, in this manner: the field simulation software 19 generates the FMU and sends the FMU to the field simulation data acquisition service 17. Further, the measurement data service 18 inputs the asset measurement data to the FMU in the field simulation data acquisition service 17 to generate asset simulation data by the field simulation data acquisition service 17 based on the FMU. The field simulation data acquisition service 17 then sends the asset simulation data to the field virtual asset gateway 16.

In the second approach, the field simulation software 19 generates asset simulation data. Some simulation software (eg, Process Simulate) can generate asset simulation data by itself, and the scene simulation software 19 can automatically output the simulation data when the measurement data service 18 sends the asset measurement data to the field simulation software 19. Accordingly, the on-site simulation data acquisition service 17 is an intermediate portion of the on-site simulation software 19 and the on-field virtual asset gateway 16, which will provide the on-field virtual asset gateway 16 with asset simulation data and interfaces. Specifically, in this manner: the measurement data service 18 inputs the asset measurement data to the field simulation data acquisition service 17. The field simulation data acquisition service 17 sends the asset measurement data to the field simulation software 19. The field simulation software 19 generates asset simulation data based on the asset measurement data and sends the asset simulation data to the field simulation data acquisition service 17. The field simulation data acquisition service 17 then sends the asset simulation data to the field virtual asset gateway 16.

The field virtual asset gateway 16 filters the data from the asset measurement data and the asset simulation data based on the virtual asset configuration information 12 provided by the cloud platform 32, and sends the filtered data to the cloud platform 32. The cloud platform can then provide virtual asset models and filtered data to applications 33 in the platform (for example, MindApps).

Figure 3:
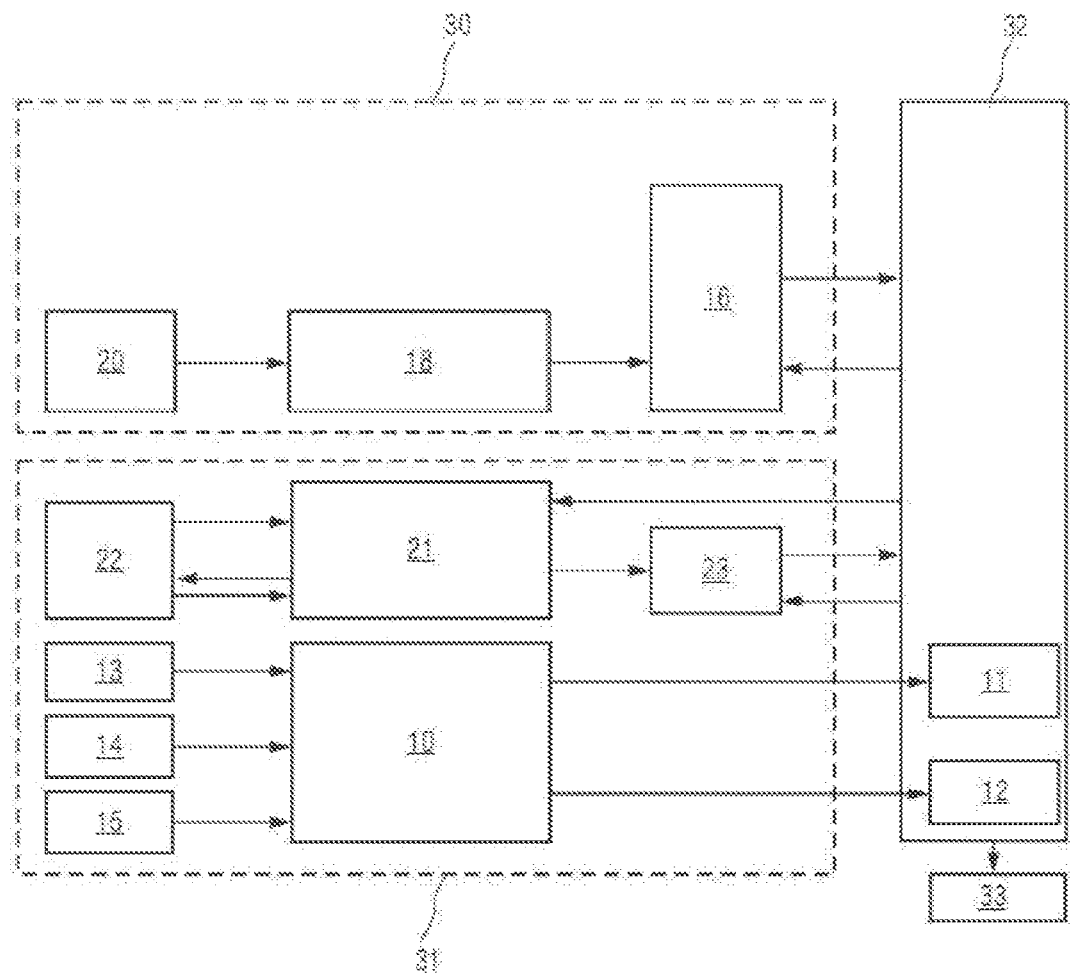
FIG. 3 is a second example architecture diagram of providing cloud platform virtual assets according to an embodiment of the present invention.

FIG. 3 is a second example architecture diagram of providing cloud platform virtual assets according to an embodiment of the present invention. FIG.

In the example architecture shown in FIG. 3, the asset measurement data of the real device 20 is acquired in the cloud 31.

In FIG. 3, the asset model integration tool 10 is employed at the cloud 31. The basic function of the asset model integration tool 10 is to integrate the cloud simulation software 13 located in the cloud 31 and the cloud automation software 14 located in the cloud 31 to generate a unified cloud semantic virtual asset model and virtual asset configuration information. The cloud simulation software 13 is simulation software that executes simulation on the real device 20, and the cloud automation software 14 is automation software of the real device 20.

The input of the asset model integration tool 10 includes: a) Cloud simulation software 13: mainly refers to PLM simulation software in different fields, such as LMS, Process Simulate, etc. The asset model integration tool 10 can extract data of production line settings, mechanical relationships, etc. from the simulation software Source context information software; b) cloud automation software 14: mainly refers to the software used in the automation system, such as TIA portal, PCS7, etc. In this automation software, the asset model integration tool 10 can obtain control logic information to enrich the context information; c) Site Installation 15. Asset Model Integration Tools 10 Modeling tools are also available to model contextual information based on the field engineer's observations of onsite settings, which can also be used to enrich contextual information.

The output of the module of the asset model integration tool 10 includes: a) a virtual asset model 11 that can describe the contextual information in some semantic languages; b) virtual asset configuration information 12 that can guide the execution of data acquisition for the on-field virtual asset gateway 16 Screening job.

The virtual asset model 11 and the virtual asset configuration information 12 output by the asset model integration tool 10 are stored in the cloud platform 32. Further, the cloud platform 32 sends the virtual asset configuration information 12 to the live virtual asset gateway 16.

In FIG. 3, a real device 20, a measurement data service 18, and a live virtual asset gateway 16 are employed in the live environment 30 where the real device 20 is located.

The measurement data service 18 may obtain the asset measurement data by performing measurements on the real device 20 and send the asset measurement data to the live virtual asset gateway 16. The field virtual asset gateway 16 sends the asset measurement data to the cloud platform 32. The measurement data service 18 preferably includes a data service in an automation system such as a PLC, an OPC UA server or the like that can connect to sensors in the real device 20 and transmit the asset measurement data to other parts of the system.

In FIG. 3, a cloud simulation software 22, a cloud simulation data acquisition service 21, and a cloud virtual asset gateway 23 are also employed in the cloud 31.

The cloud virtual asset gateway 23 acquires the asset measurement data measured by the measurement data service 18 from the cloud platform 32 and sends the asset measurement data to the cloud simulation data acquisition service 21. A model of the real device 20 is built in the cloud simulation software 22, and experiments are performed on the model to evaluate various operational strategies of the real device 20. The model of the real device 20 may be a generalized model, including a mathematical model, a physical model, and the like. Obviously, the cloud simulation software 22 has different simulation methods according to the model of the real device 20. The real device 20 may be implemented as a continuous-time system and a discrete-time system. Correspondingly, the simulation methods of the cloud simulation software 22 are also different, corresponding respectively to the continuous-time system simulation and the discrete-time system simulation.

The function of the cloud simulation data acquisition service 21 is to provide the cloud simulation software 22 with a data service, which provides an interface for the time series simulation data. The cloud simulation data acquisition service 21 acquires the asset measurement data from the cloud virtual asset gateway 23. Moreover, the input of the cloud simulation data acquisition service 21 also includes the output of the cloud simulation software 22 (PLM simulation software such as LMS Amesim, Process Simulate). The output of the cloud simulation data acquisition service 21 is asset simulation data. For example, the cloud simulation data acquisition service 21 provides the data calculated in the cloud simulation software 22 based on the asset measurement data as asset simulation data, which can be accessed by other partial systems.

For example, the asset simulation data may be generated by using the output of the cloud simulation software 22 according to following approaches.

In the first approach, the cloud simulation software 22 generates the FMU. Some PLM software, such as LMS Amesim, can generate the FMU, a library of variables that contains lists of variables, simulation models, and standard interfaces. The cloud simulation data acquisition service 21 may use the library file to generate asset simulation data. Specifically, in this manner, the cloud simulation software 22 generates the FMU and sends the FMU to the cloud simulation data acquisition service 21. Further, the measurement data service 18 inputs the asset measurement data to the cloud platform 32 via the field virtual asset gateway 16, and the cloud platform 32 inputs the asset measurement data into the FMU in the cloud simulation data acquisition service 21 via the cloud virtual asset gateway 23 to be transmitted by the cloud The simulation data acquisition service 21 generates asset simulation data based on the FMU. The cloud simulation data acquisition service 21 sends the asset simulation data to the cloud virtual asset gateway 23.

In the second approach, the cloud simulation software 22 generates asset simulation data. Some simulation software, such as Process Simulate, can generate asset simulation data on its own. The measurement data service 18 inputs the asset measurement data to the cloud platform 32 via the field virtual asset gateway 16, and the cloud platform 32 inputs the asset measurement data to the cloud simulation data acquisition service 21 via the cloud virtual asset gateway 23. The cloud simulation data acquisition service 21 sends the asset measurement data to the cloud simulation software 22. Cloud simulation software 22 can automatically output simulation data. Therefore, the cloud simulation data acquisition service 21 is an intermediate part of the cloud simulation software 22 and the cloud virtual asset gateway 23, which will provide the cloud virtual asset gateway 23 with asset simulation data and interfaces. Specifically, in this manner, the measurement data service 18 inputs the asset measurement data to the cloud platform 32 via the field virtual asset gateway 16; the cloud platform 32 inputs the asset measurement data to the cloud simulation data acquisition service 21 via the cloud virtual asset gateway 23; The cloud simulation data obtaining service 21 sends the asset measurement data to the cloud simulation software 22; the cloud simulation software 22 generates asset simulation data based on the asset measurement data, and sends the asset simulation data to the cloud virtual asset gateway 23 via the cloud simulation data acquisition service 21.

The cloud virtual asset gateway 23 filters the data from the asset measurement data and the asset simulation data based on the virtual asset configuration information 12 provided by the cloud platform 32, and sends the filtered data to the cloud platform 32. The cloud platform can then provide virtual asset models and filtered data to applications in the platform 33 (for example, MindApps).

Figure 4:
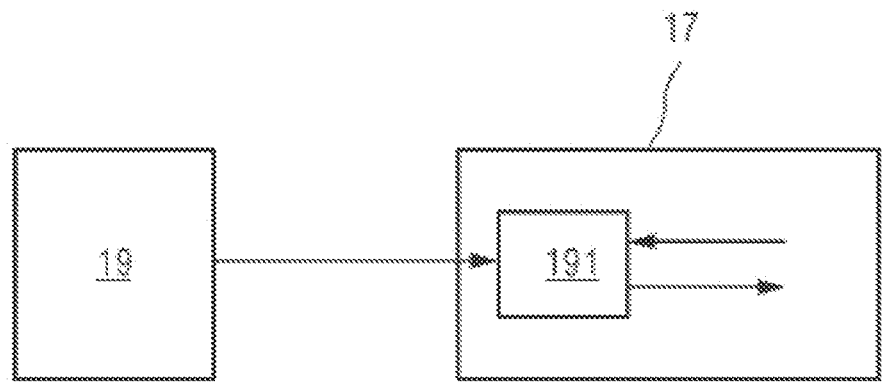
FIG. 4 is a first example schematic diagram of acquiring asset simulation data according to an embodiment of the present invention.

FIG. 4 is a first example schematic diagram of acquiring asset simulation data according to an embodiment of the present invention, which is applicable to the field simulation data acquisition service 17 in FIG. 2.

In FIG. 4, the field simulation software 19 generates the FMU 191 and sends the FMU 191 to the field simulation data acquisition service 17. The field simulation data acquisition service 17 generates asset simulation data based on the FMU and asset measurement data. The manner of generating the FMU by the field simulation software shown in FIG. 4 can also be applied to the cloud simulation data acquisition service 21 in FIG. 3.

Figure 5:
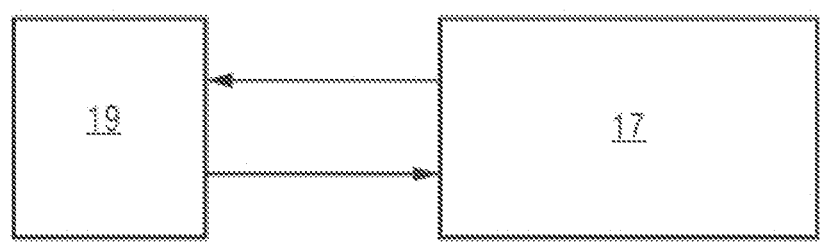
FIG. 5 is a second example schematic diagram of acquiring asset simulation data according to an embodiment of the present invention.

FIG. 5 is a second example schematic diagram of acquiring asset simulation data according to an embodiment of the present invention. FIG. This method is applicable to the field simulation data acquisition service 17 in FIG. 2.

In FIG. 5, the field simulation software 19 generates asset simulation data. Specifically, the field simulation data acquisition service 17 sends the asset measurement data to the field simulation software 19. The field simulation software 19 generates asset simulation data based on the asset measurement data and sends the asset simulation data to the field simulation data acquisition service 17. The manner of generating the FMU by the field simulation software shown in FIG. 5 can also be applied to the cloud simulation data acquisition service 21 in FIG. 3.

Figure 6:
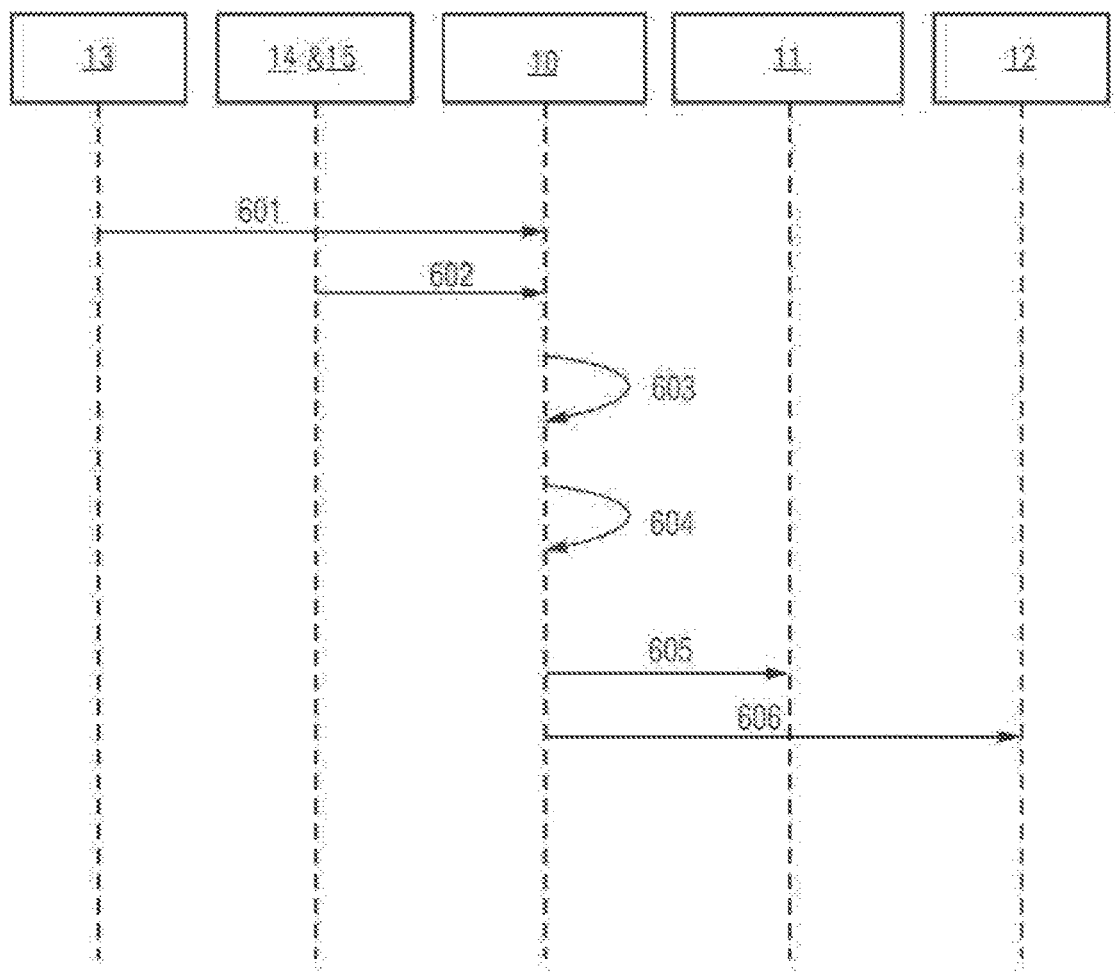
FIG. 6 is a processing flowchart of an asset model integration tool according to an embodiment of the present invention.

FIG. 6 is a processing flowchart of a asset model integration tool according to an embodiment of the present invention. The asset model integration tool may be applied as the asset model integration tool 10 in FIG. 2 or FIG. 3.

In FIG. 6, the method includes:

Step 601: The cloud simulation software 13 provides the simulation model to the asset model integration tool 10.

Step 602: The cloud automation software 14 and the on-site installation 15 provide an instance model to the asset model integration tool 10.

Step 603: The asset model integration tool 10 analyzes the simulation model and the instance model, and integrates the models into a unified semantic model to form a virtual asset model.

Step 604: The asset model integration tool 10 generates, for the cloud platform 32, virtual asset configuration information for instructing to perform data collection and screening work. The virtual asset configuration information includes one or more matching conditions.

Step 605: The asset model integration tool 10 sends the generated virtual asset configuration information to the cloud platform 32 and stores the virtual asset configuration information 11.

Step 606: The asset model integration tool 10 sends the generated virtual asset model to the cloud platform 32 and stores it as the virtual asset model 12.

Wherein, AcquireSimulationModel message is set in step 601, AcquireInstanceModel message is set in step 602, GenerateAssetModel message is set in step 603, GenerateAssetConfigration message is set in step 604, SetAssetConfiguration message is set in step 605, and SetAssetModel message is set in step 606 In order to achieve the above process of FIG. 6.

Specifically, the following describes the functions of the above message in FIG. 6:

(1) AcquireSimulationModel: It is used by Asset Model Integration Tool to acquire simulation model from Simulation Software.

(2) AcquireInstanceModel: It is used by Asset Model Integration Tool to acquire instance model from automation software and site setup.

(3) GenerateAssetModel: It is performed in Asset Model Integration Tool to analyze simulation model and instance model and integrate these models into a unified semantic model.

(4) GenerateAssetConfigration: It is performed in Asset Model Integration Tool to generate asset configuration for the cloud, the asset configuration can be used by MindConnect in the automation field to perform data acquisition.

(5) SetAssetConfiguration: It is used by Asset Model Integration Tool to set asset configuration to the asset configuration service in the cloud side.

(6) SetAssetModel: It is used by Asset Model Integration Tool to set asset model to the asset model service in the cloud side. The asset model can be used by MindApps to implement different kinds of applications.

Figure 7:
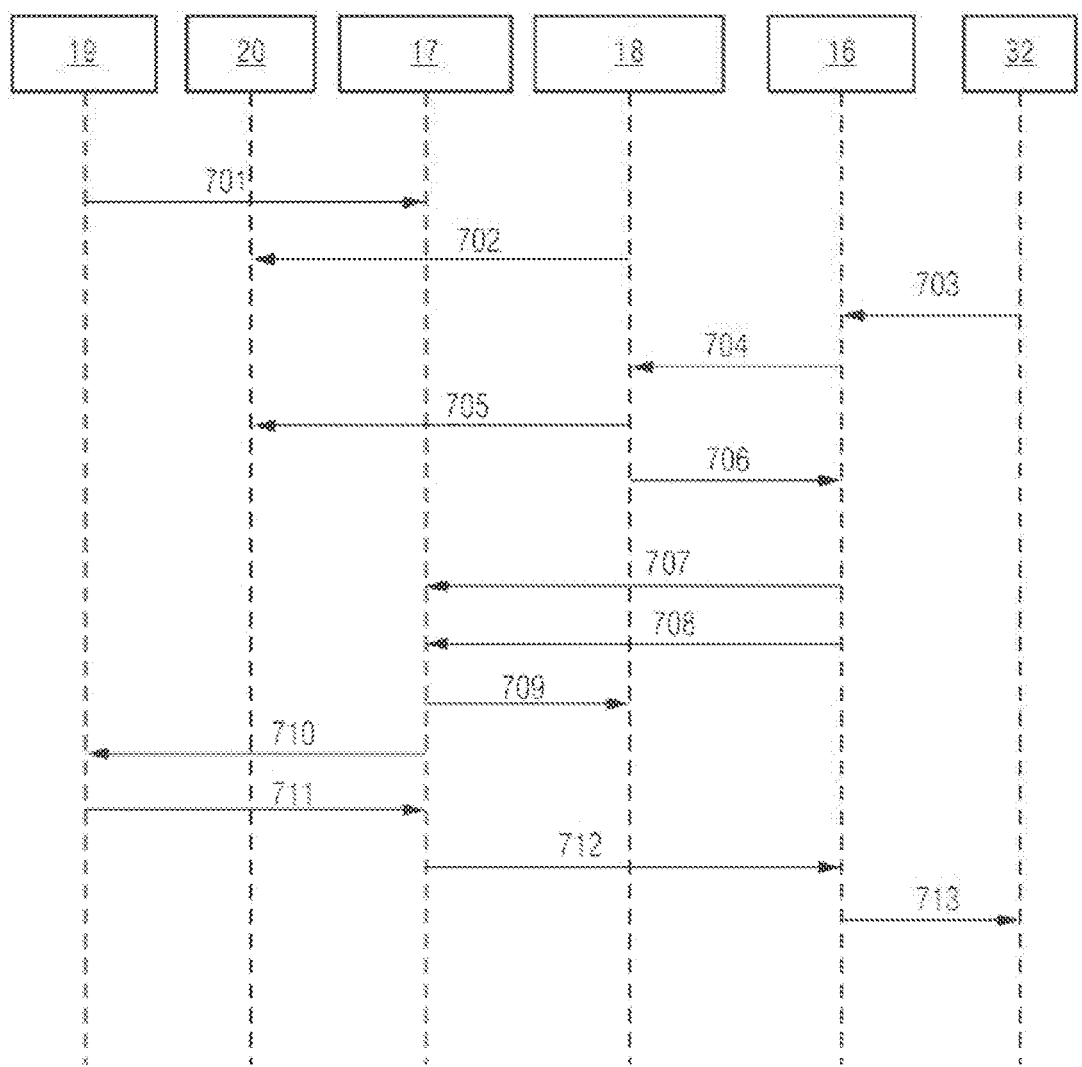
FIG. 7 is a flow chart of setting up virtual asset data on site according to an embodiment of the present invention, where data is generated by simulation software.

FIG. 7 is a flow chart of setting up virtual asset data on site according to an embodiment of the present invention, where the simulation software generates data. The flow shown in FIG. 7 can be applied to the example architecture shown in FIG. 2.

As shown in FIG. 7, the method includes:

Step 701: The field simulation data acquisition service 17 establishes a connection with the field simulation software 19.

Step 702: The measurement data service 18 (eg, PLC, OPC UA server) establishes a connection with the real device 20. For example, connect to a vibration sensor and read data from the vibration sensor.

Step 703: The field virtual asset gateway 16 obtains the virtual asset configuration information from the cloud platform 32. The virtual asset configuration information includes data source information such as the IP address of the PLC, the URL of the OPC UA server for the connection, and the URL for connecting the emulation data service, and may include data point information such as a variable address in the PLC, a node ID, and ID in the OPC UA server or in the simulation data service.

Step 704: The field virtual asset gateway 16 requests asset measurement data from the measurement data service 18.

Step 705: The measurement data service 18 reads the asset measurement data from the real device 20.

Step 706: The measurement data service 18 reports the read asset measurement data to the field virtual asset gateway 16.

Step 707: The field virtual asset gateway 16 sets a service model in the field simulation data acquisition service 17. The service model includes data source information, data point information and simulation data structure defined in the virtual asset configuration information.

Step 708: The field virtual asset gateway 16 requests virtual simulation data from the field simulation data acquisition service 17.

Step 709: The live simulation data acquisition service 17 requests asset measurement data from the measurement data service 18.

Step 710: The field simulation data acquisition service 17 provides the requested asset measurement data to the field simulation software 19.

Step 711: Field Simulation Data Acquisition Service 17 uses the field simulation software 19 to obtain asset simulation data.

Step 712: The field simulation data acquisition service 17 reports the asset simulation data to the field virtual asset gateway 16.

Step 713: The field virtual asset gateway 16 transmits the asset simulation data and the asset measurement data to the cloud platform 32.

Where SetupConnectionWithSimulationSW message is set in step 701; SetupConnectionWithPhysicalSystem message may be set in step 702; GetAssetConfiguration message may be set in step 703; RequestMeasurementData message may be set in step 704; ReadMeasurementData message may be set in step 705; ReportMeasurementData message may be set in step 706; A SetupConnectionWithSimulationSW message is set in step 707; a RequestSimulationData message is set in step 708; a RequestMeasurementData message is set in step 709; a GetSimulationData message is set in step 710; a GetSimulationData message is set in step 711, a ReportSimulationData message is set in step 712; In step 713, a SendData message is set; to implement the above process in FIG. 7

Specifically, the following describes the functions of the above message in FIG. 7:

(1) SetupConnectionWithSimulationSW: It is used by Simulation Data Service to setup connection with simulation software. The prerequisite is that the simulation software can generate simulation data by itself.

(2) SetupConnectionWithPhysicalSystem: It is used by Measurement Data Service such as PLC, OPC UA Server, to setup connections with the physical system, such as connecting to a vibration sensor and can read data from the sensor.

(3) GetAssetConfiguration: It is used by On-site Virtual Asset MindConnect to acquire asset configuration from cloud platform and setup data acquisition from Measurement Data Service and Simulation Data Service. The asset configuration includes data source information such as PLC IP address, OPC UA URL for connection, and URL to connect Simulation Data Service (it can provide an OPC UA server) and includes data points information such as variable address in PLC, and node ID in OPC UA server, or ID in Simulation Data Service.

(4) RequestMeasurementData: It is used by On-site Virtual Asset MindConnect to request measurement data from Measurement Data Service.

(5) ReadMeasurementData: It is used by Measurement Data Service to read measurement data from the physical system.

(6) ReportMeasurementData: It is used by Measurement Data Service to report measurement data to the On-site Virtual Asset MindConnect.

(7) SetSimulationDataServiceModel: It is used by On-site Virtual Asset MindConnect to set service model in Simulation Data Service, the service model includes data points and structure of simulation data which is defined in the asset configuration.

(8) RequestSimulationData: It is used by On-site Virtual Asset MindConnect to request simulation data from Simulation Data Service.

(9) RequestMeasurementData: It is used by Simulation Data Service to request data from Measurement Data Service.

(10) SetMeasurementData: It is used by Simulation Data Service to set measurement data to the Simulation Software.

(11) GetSimulationData: It is used by Simulation Data Service to get simulation data from the Simulation Software.

(12) ReportSimulationData: It is used by Simulation Data Service to report the simulation data to the On-site Virtual Asset MindConnect.

(13) SendData: It is used by On-site Virtual Asset MindConnect to transfer simulation data and measurement data to the cloud.

In this embodiment, the on-premises virtual asset gateway 16 sets the service model in the on-site simulation data acquisition service 17 based on the virtual asset configuration information so as to implement the screening of the asset simulation data acquired by the on-site simulation data acquisition service 17. Alternatively, the asset simulation data obtained by the field simulation data acquisition service 17 may not be filtered in advance, but the data is filtered from the asset measurement data and the asset simulation data based on the virtual asset configuration information uniformly at the field virtual asset gateway 16.

Figure 8:
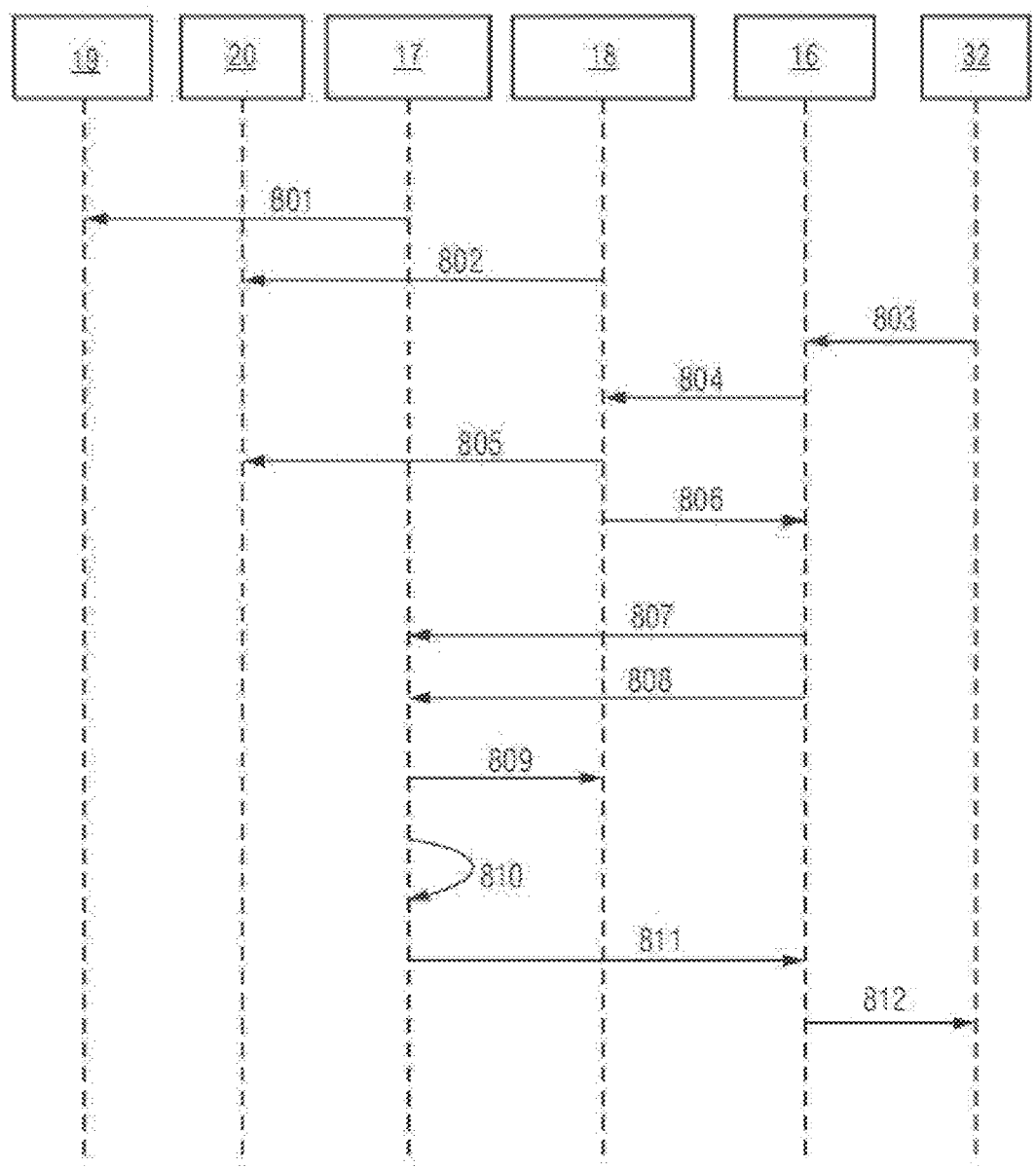
FIG. 8 is a flow chart of on-site setting of virtual asset data according to an embodiment of the present invention, where data is generated by a FMU.

FIG. 8 is a flow chart of on-site setting of virtual asset data according to an embodiment of the present invention, where data is generated by a functional model unit. The flow shown in FIG. 8 can be applied to the example architecture shown in FIG. 2.

As shown in FIG. 8, the method includes:

Step 801: The on-site simulation data acquisition service 17 establishes connection with the on-site simulation software 19.

Step 802: The measurement data service 18 (eg PLC, OPC UA server) establishes a connection with the real device 20. For example, connect to a vibration sensor and read data from the sensor.

Step 803: The field virtual asset gateway 16 obtains the virtual asset configuration information from the cloud platform 32. The virtual asset configuration information includes data source information such as PLC IP address, OPC UA URL for connection, and URL for connection to the emulation data service, and includes data point information such as a variable address in the PLC and a node ID in the OPC UA server Or ID in the simulated data service.

Step 804: The field virtual asset gateway 16 requests asset measurement data from the measurement data service 18.

Step 805: The measurement data service 18 reads the asset measurement data from the real device 20.

Step 806: The measurement data service 18 reports the read asset measurement data to the field virtual asset gateway 16.

Step 807: The field virtual asset gateway 16 sets a service model in the field simulation data acquisition service 17, and the service model includes data points, data point information and simulation data structures defined in the virtual asset configuration information.

Step 808: The field virtual asset gateway 16 requests the virtual simulation data from the field simulation data acquisition service 17.

Step 809: The field simulation data acquisition service 17 requests asset measurement data from the measurement data service 18.

Step 810: The field simulation data acquisition service 17 acquires the asset simulation data from the FMU saved by itself.

Step 811: The field simulation data acquisition service 17 reports the asset simulation data to the field virtual asset gateway 16.

Step 812: The field virtual asset gateway 16 transmits the asset simulation data and the asset measurement data to the cloud platform 32.

Where an AcquireFunctionalUnit message is set in step 801, a SetupConnectionWithPhysicalSystem message may be set in step 802, a GetAssetConfiguration message may be set in step 803, a RequestMeasurementData message may be set in step 804, a ReadMeasurementData message may be set in step 805, a ReportMeasurementData message may be set in step 806, A SetSimulationDataServiceModel message is set in step 807, a RequestSimulationData message is set in step 808, a RequestMeasurementData message is set in step 809, a CalculateSimulationData message is set in step 810, a ReportSimulationData message is set in step 811, and a SendData message is set in step 812 to The above process of FIG. 8 is implemented.

Specifically, the following describes the functions of the above message in FIG. 8:

(1) AcquireFunctionalUnit: It is used by Simulation Data Service to get FMU from simulation software. The FMU will be used by Simulation Data Service to generate simulation data.

(2) SetupConnectionWithPhysicalSystem: It is used by Measurement Data Service such as PLC, OPC UA Server, to setup connections with the physical system, such as connecting to a vibration sensor and can read data from the sensor.

(3) GetAssetConfiguration: It is used by On-site Virtual Asset MindConnect to acquire asset configuration from cloud platform and setup data acquisition from Measurement Data Service and Simulation Data Service. The asset configuration includes data source information such as PLC IP address, OPC UA URL for connection, and URL to connect Simulation Data Service (it can provide an OPC UA server) and includes data points information such as variable address in PLC, and node ID in OPC UA server, or ID in Simulation Data Service.

(4) RequestMeasurementData: It is used by On-site Virtual Asset MindConnect to request measurement data from Measurement Data Service.

(5) ReadMeasurementData: It is used by Measurement Data Service to read measurement data from the physical system.

(6) ReportMeasurementData: It is used by Measurement Data Service to report measurement data to the On-site Virtual Asset MindConnect.

(7) SetSimulationDataServiceModel: It is used by On-site Virtual Asset MindConnect to set service model in Simulation Data Service, the service model includes data points and structure of simulation data which is defined in the asset configuration.

(8) RequestSimulationData: It is used by On-site Virtual Asset MindConnect to request simulation data from Simulation Data Service.

(9) RequestMeasurementData: It is used by Simulation Data Service to request data from Measurement Data Service.

(10) CalculateSimulationData: It is used by Simulation Data Service to get simulation data from the FMU.

(11) ReportSimulationData: It is used by Simulation Data Service to report the simulation data to the On-site Virtual Asset MindConnect.

(12) SendData: It is used by On-site Virtual Asset MindConnect to transfer simulation data and measurement data to the cloud.

In this embodiment, the on-premises virtual asset gateway 16 sets the service model in the on-site simulation data acquisition service 17 based on the virtual asset configuration information so as to implement the screening of the asset simulation data acquired by the on-site simulation data acquisition service 17. Alternatively, the asset simulation data obtained by the field simulation data acquisition service 17 may not be filtered in advance, but the data is filtered from the asset measurement data and the asset simulation data based on the virtual asset configuration information uniformly at the field virtual asset gateway 16.

Figure 9:
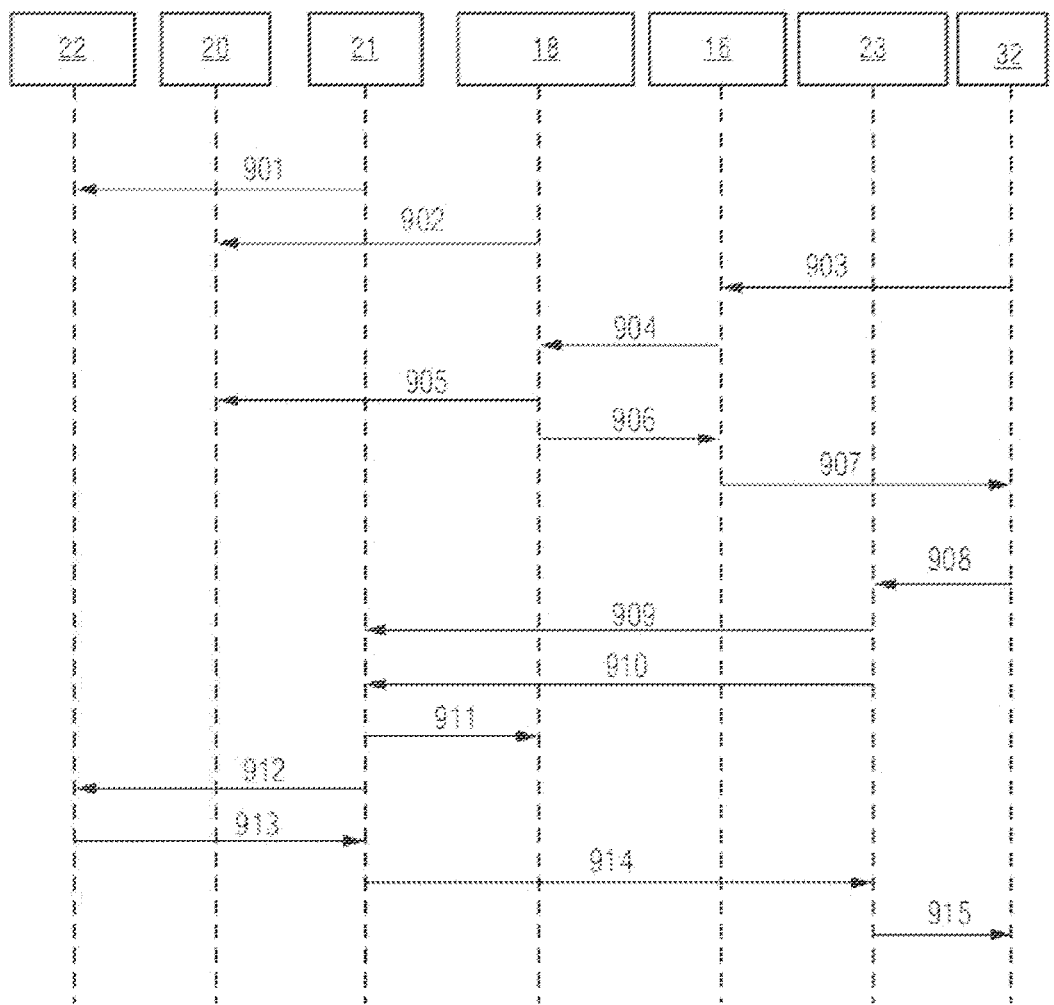
FIG. 9 is a flow chart of setting up virtual asset data in the cloud according to an embodiment of the present invention, where data is generated by simulation software.

FIG. 9 is a flow chart of setting up virtual asset data in the cloud according to an embodiment of the present invention, where data is generated by simulation software. The flow shown in FIG. 9 can be applied to the example architecture shown in FIG. 3.

As shown in FIG. 9, the method includes:

Step 901: The cloud simulation data acquisition service 21 establishes a connection with the cloud simulation software 22.

Step 902: The measurement data service 18 (eg, PLC, OPC UA server) establishes a connection with the real device 20. For example, connect to a vibration sensor and read data from the sensor.

Step 903: The field virtual asset gateway 16 obtains the virtual asset configuration information from the cloud platform 32. Virtual asset configuration information includes data source information (e.g., the IP address of the PLC, OPC UA server URL used to connect the emulator and the data service connection URL), and point information including data such as the PLC variable address, node ID in the OPC UA server ID in or in the simulated data service.

Step 904: The live virtual asset gateway 16 requests asset measurement data from the measurement data service 18.

Step 905: The measurement data service 18 reads the asset measurement data from the real device 20.

Step 906: The measurement data service 18 reports the read asset measurement data to the field virtual asset gateway 16.

Step 907: The field virtual asset gateway 16 reports the asset measurement data to the cloud platform 32.

Step 908: The cloud virtual asset gateway 23 obtains the virtual asset configuration information from the cloud platform 32. Virtual and cloud asset configuration information includes simulation data acquisition services URL 21 and includes data point information, such as the PLC variable address and node ID in the OPC UA server or analog data service ID.

Step 909: cloud virtual asset gateway 23 to set the cloud service model simulation data acquisition services in 21 service models including virtual assets defined in the configuration information analog data points and data structures.

Step 910: The cloud virtual asset gateway 23 requests virtual simulation data from the cloud simulation data acquisition service 21.

Step 911: The cloud simulation data acquisition service 21 requests asset measurement data from the measurement data service 18.

Step 912: The cloud simulation data acquisition service 21 provides the requested asset measurement data to the cloud simulation software 22.

Step 913: The cloud simulation data acquisition service 21 uses the cloud simulation software 22 to acquire the asset simulation data.

Step 914: The cloud simulation data acquisition service 21 reports the asset simulation data to the cloud virtual asset gateway 23.

Step 915: The cloud virtual asset gateway 23 transmits the asset simulation data and the asset measurement data to the cloud platform 32.

Here, SetupConnectionWithSimulationSW message is set in step 901, SetupConnectionWithPhysicalSystem message may be set in step 902, GetAssetConfiguration message may be set in step 903, RequestMeasurementData message may be set in step 904, ReadMeasurementData message may be set in step 905, ReportMeasurementData message may be set in step 906 provided in step 907 SendData message, 908 is provided GetAssetConfiguration message in step, provided SetSimulationDataServiceModel message in step 909, provided RequestSimulationData message in step 910, provided RequestMeasurementData message in step 911, provided SetMeasurementData message in step 912, the In Step 913, a GetSimulationData message is set, a ReportSimulationData message is set in Step 914, and a SendData message is set in Step 915 to implement the above flow of FIG. 9.

Specifically, the following describes the function of the above message in FIG. 9:

(1) SetupConnectionWithSimulationSW: It is used by Simulation Data Service to setup connection with simulation software. The prerequisite is that the simulation software can generate simulation data by itself.

(2) SetupConnectionWithPhysicalSystem: It is used by Measurement Data Service such as PLC, OPC UA Server, to setup connections with the physical system, such as connecting to a vibration sensor and can read data from the sensor.

(3) GetAssetConfiguration: It is used by On-site Virtual Asset MindConnect to acquire asset configuration from cloud platform and setup data acquisition from Measurement Data Service. The asset configuration includes data source information such as PLC IP address, OPC UA URL for connection and includes data points information such as variable address in PLC, and node ID in OPC UA server.

(4) RequestMeasurementData: It is used by On-site Virtual Asset MindConnect to request measurement data from Measurement Data Service.

(5) ReadMeasurementData: It is used by Measurement Data Service to read measurement data from the physical system.

(6) ReportMeasurementData: It is used by Measurement Data Service to report measurement data to the On-site Virtual Asset MindConnect.

(7) SendData: It is used by On-site Virtual Asset MindConnect to transfer measurement data to the cloud.

(8) GetAssetConfiguration: It is used by On-cloud Virtual Asset MindConnect to acquire asset configuration from cloud platform and setup data acquisition from Simulation Data Service. The asset configuration includes URL to connect Simulation Data Service (it can provide an OPC UA server) and data points information such as IDs in Simulation Data Service.

(9) SetSimulationDataServiceModel: It is used by On-cloud Virtual Asset MindConnect to set service model in Simulation Data Service, the service model includes data points and structure of simulation data which is defined in the asset configuration.

(10) RequestSimulationData: It is used by On-cloud Virtual Asset MindConnect to request simulation data from Simulation Data Service.

(11) RequestMeasurementData: It is used by Simulation Data Service to request data from Measurement Data Service.

(12) SetMeasurementData: It is used by Simulation Data Service to set measurement data to the Simulation Software.

(13) GetSimulationData: It is used by Simulation Data Service to get simulation data from the Simulation Software.

(14) ReportSimulationData: It is used by Simulation Data Service to report the simulation data to the On-cloud Virtual Asset MindConnect.

(15) SendData: It is used by On-cloud Virtual Asset MindConnect to transfer simulation data and measurement data to the cloud.

In this embodiment, the cloud virtual asset gateway 23 sets a service model in the cloud simulation data acquisition service 21 based on the virtual asset configuration information, so as to implement the screening of the asset simulation data acquired by the cloud simulation data acquisition service 21. Alternatively, the asset simulation data acquired by the cloud simulation data acquisition service 21 may or may not be selected in advance. Instead, the cloud simulation data acquisition service 21 uniformly filters the asset measurement data and the asset simulation data based on the virtual asset configuration information data.

Figure 10:
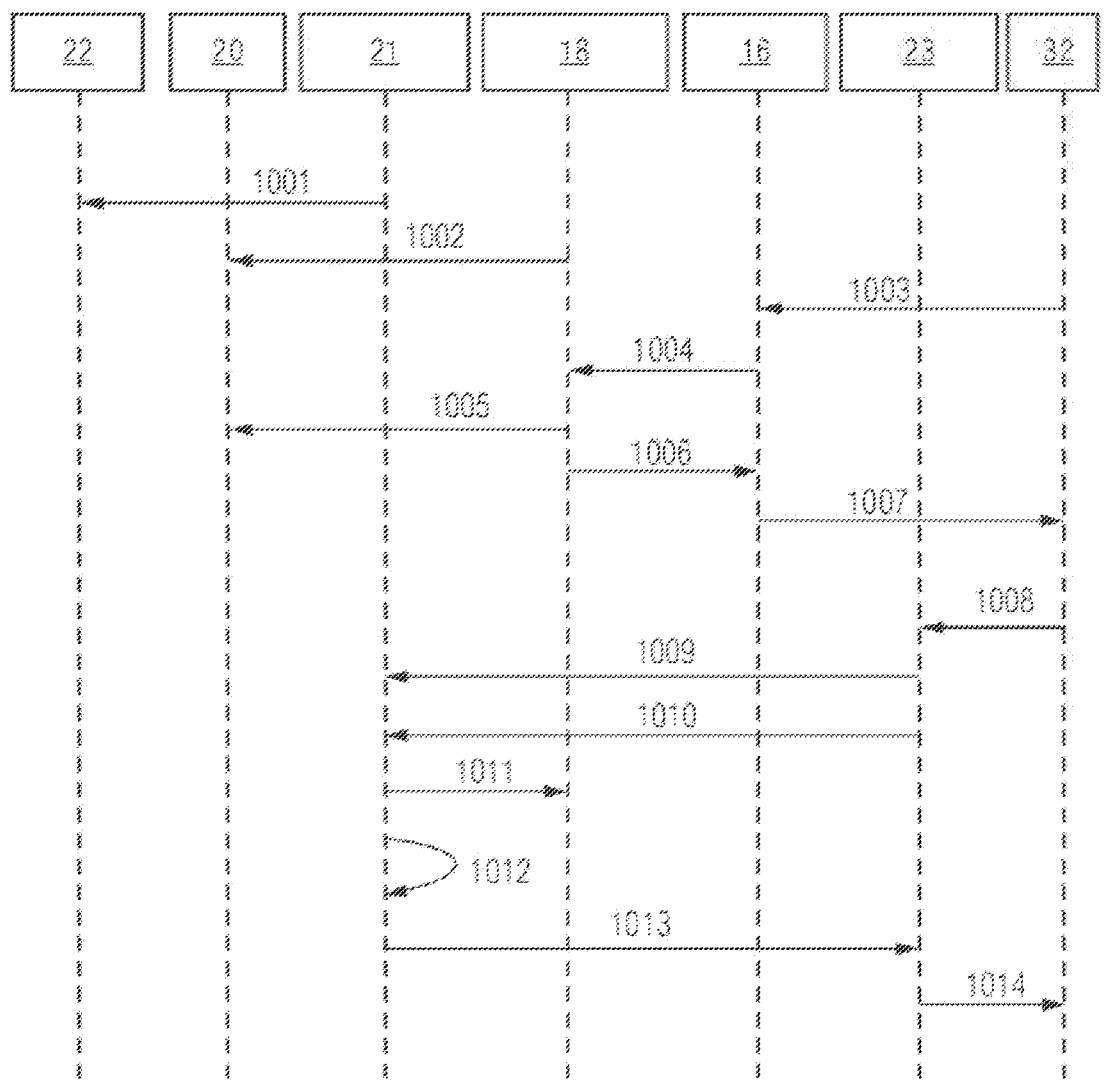
FIG. 10 is a flow chart of setting virtual asset data in the cloud according to an embodiment of the present invention, where data is generated by a FMU.

FIG. 10 is a flow chart of setting virtual asset data in the cloud according to an embodiment of the present invention, where data is generated by a functional model unit. The flow shown in FIG. 10 can be applied to the example architecture shown in FIG. 3.

As shown in FIG. 10, the method includes:

Step 1001: The cloud simulation data acquisition service 21 establishes a connection with the cloud simulation software 22.

Step 1002: The measurement data service 18 (eg PLC, OPC UA server) establishes a connection with the real device 20. For example, connect to a vibration sensor and read data from the sensor.

Step 1003: The field virtual asset gateway 16 obtains the virtual asset configuration information from the cloud platform 32. The virtual asset configuration information includes data source information such as PLC IP address, OPC UA URL for connection, and URL for connection to the emulation data service, and includes data point information such as a variable address and a node ID in the PLC in the OPC UA server Or ID in the simulated data service.

Step 1004: The field virtual asset gateway 16 requests asset measurement data from the measurement data service 18.

Step 1005: The measurement data service 18 reads the asset measurement data from the real device 20.

Step 1006: The measurement data service 18 reports the read asset measurement data to the field virtual asset gateway 16.

Step 1007: The field virtual asset gateway 16 reports the asset measurement data to the cloud platform 32.

Step 1008: The cloud virtual asset gateway 23 obtains the virtual asset configuration information from the cloud platform 32. Virtual and cloud asset configuration information includes simulation data acquisition services URL 21 and includes data point information, such as the PLC variable address and node ID in the OPC UA server or analog data service ID.

Step 1009: The cloud virtual asset gateway 23 sets a service model in the cloud simulation data acquisition service 21, where the service model includes data points and simulation data structures defined in the virtual asset configuration information.

Step 1010: The cloud virtual asset gateway 23 requests virtual simulation data from the cloud simulation data acquisition service 21.

Step 1011: The cloud simulation data acquisition service 21 requests asset measurement data from the measurement data service 18.

Step 1012: The cloud simulation data acquisition service 21 provides the requested asset measurement data to its own saved FMU, and obtains the asset simulation data based on the FMU.

Step 1013: The cloud simulation data acquisition service 21 reports the asset simulation data to the cloud virtual asset gateway 23.

Step 1014: The cloud virtual asset gateway 23 transmits the asset simulation data and the asset measurement data to the cloud platform 32.

Where an AcquireFunctionalUnit message is set in step 1001, a SetupConnectionWithPhysicalSystem message is set in step 1002, a GetAssetConfiguration message is set in step 1003, a RequestMeasurementData message is set in step 1004, a ReadMeasurementData message is set in step 1005, and a ReportMeasurementData message is set in step 1006, A SendData message is set in step 1007, a GetAssetConfiguration message is set in step 1008, a SetSimulationDataServiceModel message is set in step 1009, a RequestSimulationData message is set in step 1010, a RequestMeasurementData message is set in step 1011, a CalculateSimulationData message is set in step 1012, In step 1013, a ReportSimulationData message is set, and a SendData message is set in step 1014 to implement the above process in FIG. 10.

Specifically, the following describes the function of the above message in FIG. 10:

(1) AcquireFunctionalUnit: It is used by Simulation Data Service to get FMU from simulation software. The FMU will be used by Simulation Data Service to generate simulation data.

(2) SetupConnectionWithPhysicalSystem: It is used by Measurement Data Service such as PLC, OPC UA Server, to setup connections with the physical system, such as connecting to a vibration sensor and can read data from the sensor.

(3) GetAssetConfiguration: It is used by On-site Virtual Asset MindConnect to acquire asset configuration from cloud platform and setup data acquisition from Measurement Data Service. The asset configuration includes data source information such as PLC IP address, OPC UA URL for connection and includes data points information such as variable address in PLC, and node ID in OPC UA server.

(4) RequestMeasurementData: It is used by On-site Virtual Asset MindConnect to request measurement data from Measurement Data Service.

(5) ReadMeasurementData: It is used by Measurement Data Service to read measurement data from the physical system.

(6) ReportMeasurementData: It is used by Measurement Data Service to report measurement data to the On-site Virtual Asset MindConnect.

(7) SendData: It is used by On-site Virtual Asset MindConnect to transfer measurement data to the cloud.

(8) GetAssetConfiguration: It is used by On-cloud Virtual Asset MindConnect to acquire asset configuration from cloud platform and setup data acquisition from Simulation Data Service. The asset configuration includes URL to connect Simulation Data Service (it can provide an OPC UA server) and data points information such as IDs in Simulation Data Service.

(9) SetSimulationDataServiceModel: It is used by On-cloud Virtual Asset MindConnect to set service model in Simulation Data Service, the service model includes data points and structure of simulation data which is defined in the asset configuration.

(10) RequestSimulationData: It is used by On-cloud Virtual Asset MindConnect to request simulation data from Simulation Data Service.

(11) RequestMeasurementData: It is used by Simulation Data Service to request data from Measurement Data Service.

(12) CalculateSimulationData: It is used by Simulation Data Service to get simulation data from the FMU.

(13) ReportSimulationData: It is used by Simulation Data Service to report the simulation data to the On-cloud Virtual Asset MindConnect.

(14) SendData: It is used by On-cloud Virtual Asset MindConnect to transfer simulation data and measurement data to the cloud.

In this embodiment, the cloud virtual asset gateway 23 sets a service model in the cloud simulation data acquisition service 21 based on the virtual asset configuration information, so as to implement the screening of the asset simulation data acquired by the cloud simulation data acquisition service 21. Alternatively, the asset simulation data acquired by the cloud simulation data acquisition service 21 may or may not be selected in advance. Instead, the cloud simulation data acquisition service 21 uniformly filters the asset measurement data and the asset simulation data based on the virtual asset configuration information data.

Figure 11:
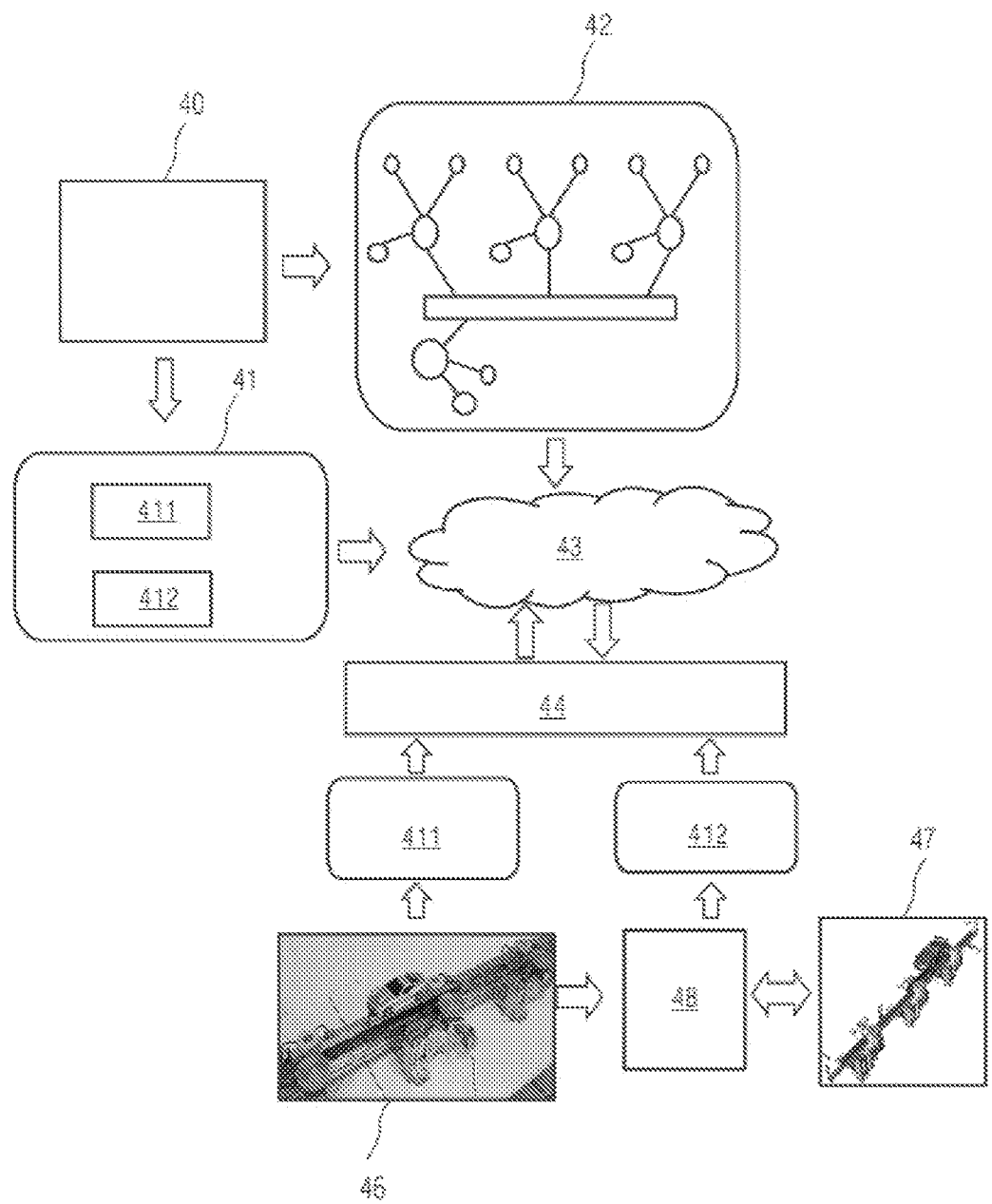
FIG. 11 is a schematic diagram of cloud platform virtual assets providing integration of simulation data and measurement data according to an embodiment of the present invention. FIG.

The following examples illustrate the invention in detail. FIG. 11 is a schematic diagram of providing cloud platform virtual assets for integrating emulation data and measurement data according to an embodiment of the present invention, where the application is in the field of automobile assembly.

In FIG. 11, the asset model integration tool 40 generates the virtual asset configuration information 41 and the virtual asset model 42. The virtual asset model 42 includes relationships among nodes in the vehicle assembly. The virtual asset configuration information 41 includes a first matching condition 411 and a second matching condition 422, where the first matching condition 411 is used for filtering and screening the automobile assembly field device 46; The second matching condition 412 is used to filter and simulate the simulation data provided by the automobile assembly simulation device 47. The first matching condition 411 includes a node ID and a sensor address and the second matching condition 411 includes a collection parameter type (eg, speed) and a sensor address.

In the cloud 43, the virtual asset configuration information 41 and the virtual asset model 42 are stored.

Vehicle assembly field devices 46 generate measurement data. At the cloud gateway 44, the measurement data generated by the automobile assembly field device 46 is filtered based on the first matching condition 411, and the filtered measurement data is saved to the cloud.

The vehicle assembly field device 46 also sends the measurement data to the simulation data service 48. Simulation data service 48 generates simulation data based on the measurement data and vehicle assembly simulation device 47. At the cloud gateway 44, the simulation data generated by the simulation data service 48 is filtered based on the second matching condition 412, and the filtered simulation data is saved to the cloud.

Based on the above description, an embodiment of the present invention further provides an apparatus for providing virtual assets of a cloud platform.

Figure 12:
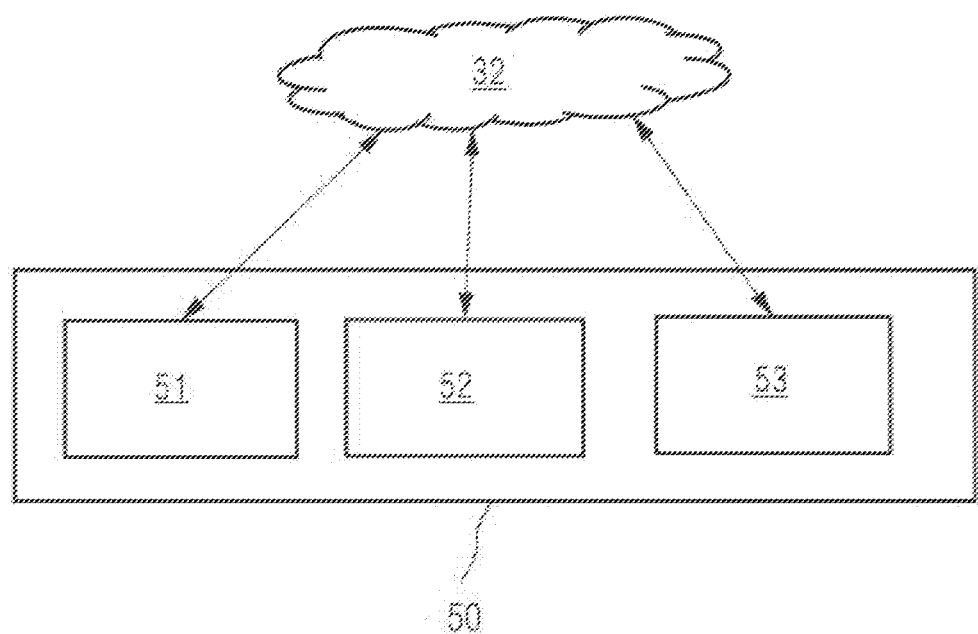
FIG. 12 is a structural diagram of an apparatus for providing cloud platform virtual assets according to an embodiment of the present invention.

FIG. 12 is a structural diagram of an apparatus for providing cloud platform virtual assets according to an embodiment of the present invention.

As shown in FIG. 12, the apparatus 50 for providing cloud platform virtual assets includes:

a virtual asset configuration information and virtual asset generating module 51, configured to generate virtual asset configuration information 12 and a virtual asset model 11, and send the virtual asset configuration information 12 and the virtual asset model 11 to a cloud platform 32;

a filtering module 52, configured to obtain asset measurement data of a real device 20 and obtain asset simulation data from a simulation side of the real device 20, and filter the asset measurement data and the asset simulation data based on the virtual asset configuration information 12 provided by the cloud platform 32 and send the filtered data to the cloud platform 32; and a providing module 53, configured to provide the virtual asset model 11 and the filtered data from the cloud platform 32.

In one embodiment, wherein the virtual asset configuration information and virtual asset generating module 51, configured to obtain a simulation model from a simulation side of the real device 20, to obtain a first instance model from an automation side of the real device 20, to obtain a second instance model from a field installation of the real device 20, and to generate the virtual asset configuration information 12 and the virtual asset model 1 based on the simulation model, the first instance model and the second instance model.

In one embodiment, wherein to obtain a simulation model from a simulation side of the real device 20 comprises: to obtain context information of a data source from a product lifecycle management simulation software 13 of the real device 20; or wherein to obtain a first instance model from an automation side of the real device 20 comprises: to obtain control logic information from an automation software 14 of the real device 20; or wherein to obtain a second instance model from a field installation of the real device 20 comprises: generating context information of a data source via a modeling tool based on observation of a live installation process 15 of the real device 20.

In one embodiment, wherein the filtering module 52, configured to perform a measurement on the real device 20 at the site of the real device 20 to obtain the asset measurement data of the real device 20; or, configured to obtain asset measurement data of the real device 20 from a cloud 31.

In one embodiment, wherein to obtain asset simulation data from a simulation side of the real device 20 comprises: enabling a simulation data acquisition service 17 deployed at the site 30 of the real device 20 to retrieve the asset simulation data from a simulation side deployed at the site 30; or, enabling a simulation data acquisition service 21 deployed in the cloud 31 to retrieve the asset simulation data from a simulation side deployed in the cloud 31.

In one embodiment, wherein to enable a simulation data acquisition service 17 deployed at the site 30 of the real device 20 to retrieve the asset simulation data from a simulation side deployed at the site 30 comprises: performing a measurement on the real device 20 at the site 30 of the real device 20 to obtain asset measurement data of the real device 20; sending the asset measurement data to the simulation data acquisition service 17 deployed at the site 30 of the real device 20; and enabling the simulation data acquisition service 17 deployed at the site 30 of the real device 20 to acquire the asset simulation data from a simulation side deployed at the site 30 based on the asset measurement data.

In one embodiment, wherein enabling the simulation data acquisition service 17 deployed at the site 30 of the real device 20 to acquire the asset simulation data from a simulation side deployed at the site 30 based on the asset measurement data comprises: enabling the simulation side deployed at the site 30 to generate a FMU 191 and send the FMU 191 to the simulation data acquisition service 17 deployed at the site 30 of the real device 20; and inputting the asset measurement data to the FMU 191 in the simulation data acquisition service 17 to generate the asset simulation data.

In one embodiment, wherein enabling the simulation data acquisition service 17 deployed at the site 30 of the real device 20 to acquire the asset simulation data from a simulation side deployed at the site 30 based on the asset measurement data comprises: enabling the simulation data acquisition service 17 to send the asset measurement data to the simulation side deployed at the site 30; and enabling the simulation side deployed at the site 30 to generate the asset simulation data based on the asset measurement data and to send the asset simulation data to the simulation data acquisition service 17.

In one embodiment, wherein enabling a simulation data acquisition service 21 deployed in the cloud 31 to retrieve the asset simulation data from a simulation side deployed in the cloud 31 comprises: enabling a simulation data acquisition service 21 deployed in the cloud 31) to obtain the asset measurement data from the cloud 31; enabling the simulation data acquisition service 21 deployed in the cloud 31 to obtain the asset simulation data from a simulation side deployed in the cloud 31 based on the asset measurement data.

In one embodiment, wherein enabling the simulation data acquisition service 21 deployed in the cloud 31 to obtain the asset simulation data from a simulation side deployed in the cloud 31 based on the asset measurement data comprises: enabling the simulation data acquisition service 21 deployed in the cloud 31 to send the asset measurement data to a simulation side deployed in the cloud 31; enabling the simulation side deployed in the cloud 31 to generate the asset simulation data based on the asset measurement data and to send the asset simulation data to the simulation data acquisition service 21.

In one embodiment, wherein enabling the simulation data acquisition service 21 deployed in the cloud 31 to obtain the asset simulation data from a simulation side deployed in the cloud 31 based on the asset measurement data comprises: enabling the simulation side deployed in the cloud 31 to generate a FMU 191 and send the FMU 19) to the simulation data acquisition service 21; and inputting the asset measurement data to the FMU 191 in the simulation data acquisition service 21 to generate the asset simulation data.

In one embodiment, wherein the virtual asset configuration information 12 comprising one or more matching conditions and wherein filtering the asset measurement data and the asset simulation data comprises: matching the asset measurement data and the asset simulation data with the matching conditions respectively, and determining the data that meets the matching conditions as the filtered data.

It should be noted that not all steps and modules in the foregoing processes and structural diagrams are necessary, and certain steps or modules may be omitted according to actual needs. The order of execution of each step is not fixed and can be adjusted as needed. The division of each module is merely for the purpose of describing the functional division used. In actual implementation, one module may be implemented by multiple modules, and the functions of multiple modules may also be implemented by one and the same module, and the modules may be located on the same device Can also be located in different devices.

The hardware modules in the various embodiments may be implemented mechanically or electronically. For example, a hardware module may include a specially designed permanent circuit or logic device (such as a dedicated processor, such as an FPGA or ASIC) for performing a specific operation. The hardware module may also include a programmable logic device or circuit (eg, including a general purpose processor or other programmable processor) that is provisionally configured by software for performing particular operations. The specific implementation of the hardware module, either mechanically, using a dedicated permanent circuit or using a temporarily configured circuit (as configured by software), can be based on cost and time considerations.

An embodiment of the present invention also provides a machine-readable storage medium storing instructions for causing a machine to execute the method as described herein. Specifically, a system or apparatus equipped with a storage medium may be provided on which software program codes that implement the functions of any of the above-described embodiments are stored, and the computer (or CPU or MPU) Reads out and executes the program code stored in the storage medium. In addition, some or all of the actual operations can be performed by operating the operating system on the computer based on the instructions of the program code. It is also possible to write the program code read out from the storage medium into the memory provided in the extension board inserted into the computer or into the memory provided in the extension unit connected to the computer and then set the program code A CPU on an expansion board or expansion unit, etc. to perform some or all of the actual operations, so as to implement the functions of any one of the above-mentioned embodiments.

Storage media implementations for providing program code include a floppy disk, a hard disk, a magneto-optical disk, an optical disk such as a CD-ROM, CD-R, CD-RW, DVD-ROM, DVD-RAM, DVD-RW, DVD+RW, Tape, non-volatile memory card and ROM. Alternatively, the program code may be downloaded from the server computer by the communications network.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for providing cloud platform virtual assets, comprising:

generating virtual asset configuration information and a virtual asset model, and sending the virtual asset configuration information and the virtual asset model generated to a cloud platform;

obtaining asset measurement data of a real device and obtaining asset simulation data from a simulation side of the real device, and filtering the asset measurement data and the asset simulation data obtained based on the virtual asset configuration information provided by the cloud platform and sending the asset measurement data and the asset simulation data, filtered, to the cloud platform; and providing the virtual asset model generated and the asset measurement data and the asset simulation data, filtered, from the cloud platform, wherein the generating of the virtual asset configuration information and the virtual asset model comprises:

obtaining a simulation model from a simulation side of the real device;

obtaining a first instance model from an automation side of the real device;

obtaining a second instance model from a field installation of the real device; and generating the virtual asset configuration information and the virtual asset model based on the simulation model, the first instance model and the second instance model obtained, and wherein the obtaining of the simulation model from a simulation side of the real device comprises:

obtaining context information of a data source from a product lifecycle management simulation software of the real device; or wherein the obtaining of the first instance model from an automation side of the real device comprises:

obtaining control logic information from an automation software of the real device; or wherein the obtaining of the second instance model from a field installation of the real device comprises:
generating context information of a data source via a modeling tool based on observation of a live installation process of the real device.

2. The method of claim 1, wherein the obtaining of the asset measurement data of a real device comprises:
performing a measurement on the real device at a site of the real device to obtain asset measurement data of the real device; or
obtaining asset measurement data of the real device from a cloud.

3. The method of claim 1, wherein the obtaining of the asset simulation data from the simulation side of the real device comprises:
enabling a simulation data acquisition service deployed at the site of the real device to retrieve asset simulation data from a simulation side deployed at the site; or,
enabling a simulation data acquisition service deployed in the cloud to retrieve asset simulation data from a simulation side deployed in the cloud.

4. The method of claim 3, wherein the enabling of the simulation data acquisition service deployed at the site of the real device to retrieve asset simulation data from the simulation side deployed at the site comprises:
performing a measurement on the real device at the site of the real device to obtain asset measurement data of the real device;
sending the asset measurement data to the simulation data acquisition service deployed at the site of the real device; and
enabling the simulation data acquisition service deployed at the site of the real device to acquire the asset simulation data from a simulation side deployed at the site based on the asset measurement data.

5. The method of claim 4, wherein the enabling of the simulation data acquisition service deployed at the site of the real device to acquire the asset simulation data from the simulation side deployed at the site based on the asset measurement data comprises:
enabling the simulation side deployed at the site to generate a FMU and send the FMU to the simulation data acquisition service deployed at the site of the real device; and
inputting the asset measurement data to the FMU in the simulation data acquisition service to generate the asset simulation data.

6. The method of claim 4, wherein the enabling of the simulation data acquisition service deployed at the site of the real device to acquire asset simulation data from a simulation side deployed at the site based on the asset measurement data comprises:
enabling the simulation data acquisition service to send the asset measurement data to the simulation side deployed at the site; and
enabling the simulation side deployed at the site to generate the asset simulation data based on the asset measurement data and to send the asset simulation data to the simulation data acquisition service.

7. The method of claim 3, wherein the enabling of the simulation data acquisition service deployed in the cloud to retrieve the asset simulation data from a simulation side deployed in the cloud comprises:
enabling a simulation data acquisition service deployed in the cloud to obtain the asset measurement data from the cloud; and
enabling the simulation data acquisition service deployed in the cloud to obtain the asset simulation data from a simulation side deployed in the cloud based on the asset measurement data.

8. The method of claim 7, wherein the enabling of the simulation data acquisition service deployed in the cloud to obtain the asset simulation data from a simulation side deployed in the cloud based on the asset measurement data comprises:
enabling the simulation data acquisition service deployed in the cloud to send the asset measurement data to a simulation side deployed in the cloud; and
enabling the simulation side deployed in the cloud to generate the asset simulation data based on the asset measurement data and to send the asset simulation data to the simulation data acquisition service.

9. The method of claim 7, wherein the enabling of the simulation data acquisition service deployed in the cloud to obtain the asset simulation data from a simulation side deployed in the cloud based on the asset measurement data comprises:
enabling the simulation side deployed in the cloud to generate a FMU and send the FMU to the simulation data acquisition service; and
inputting the asset measurement data to the FMU in the simulation data acquisition service to generate the asset simulation data.

10. The method of claim 1, wherein the virtual asset configuration information includes one or more matching conditions and wherein the filtering of the asset measurement data and the asset simulation data comprises:
matching the asset measurement data and the asset simulation data with the matching conditions, respectively, and
determining the data that meets the matching conditions as the asset measurement data and the asset simulation data, filtered.

11. A non-transitory computer-readable medium comprising computer instructions stored thereon which, upon execution of the computer instructions by a processor, the processor performing the method for providing cloud platform virtual assets of claim 1.

12. An apparatus for providing cloud platform virtual assets, comprising:
a virtual asset configuration information and virtual asset generating module, configured to generate virtual asset configuration information and a virtual asset model, and send the virtual asset configuration information and the virtual asset model to a cloud platform;
a filtering module, configured to obtain asset measurement data of a real device and obtain asset simulation data from a simulation side of the real device, and configured to filter the asset measurement data and the asset simulation data based on the virtual asset configuration information provided by the cloud platform and send the asset measurement data and the asset simulation data, filtered, to the cloud platform; and
a providing module, configured to provide the virtual asset model and the asset measurement data and the asset simulation data, filtered, data from the cloud platform,
wherein the virtual asset configuration information and virtual asset generating module, is configured to obtain a simulation model from a simulation side of the real device, to obtain a first instance model from an automation side of the real device, to obtain a second instance model from a field installation of the real device, and to generate the virtual asset configuration information and the virtual asset model based on the simulation model, the first instance model and the second instance model, and wherein obtaining of the simulation model from a simulation side of the real device comprises the virtual asset configuration information and virtual asset generating module being configured to obtain context information of a data source from a product lifecycle management simulation software of the real device; or wherein the obtaining of the first instance model from an automation side of the real device comprises the virtual asset configuration information and virtual asset generating module being configured to obtain control logic information from an automation software of the real device; or wherein the obtaining of the second instance model from a field installation of the real device comprises the virtual asset configuration information and virtual asset generating module being configured to generate context information of a data source via a modeling tool based on observation of a live installation process of the real device.

13. The apparatus of claim 12, wherein the filtering module
is configured to perform a measurement on the real device at the site of the real device to obtain the asset measurement data of the real device; or
is configured to obtain asset measurement data of the real device from a cloud.

14. The apparatus of claim 12, wherein the filtering module being configured to obtain asset simulation data from a simulation side of the real device comprises:
enabling a simulation data acquisition service deployed at the site of the real device to retrieve the asset simulation data from a simulation side deployed at the site; or
enabling a simulation data acquisition service deployed in the cloud to retrieve the asset simulation data from a simulation side deployed in the cloud.

15. The apparatus of claim 12, wherein to enable a simulation data acquisition service deployed at the site of the real device to retrieve the asset simulation data from a simulation side deployed at the site comprises:
performing a measurement on the real device at the site of the real device to obtain asset measurement data of the real device;
sending the asset measurement data to the simulation data acquisition service deployed at the site of the real device; and
enabling the simulation data acquisition service deployed at the site of the real device to acquire the asset simulation data from a simulation side deployed at the site based on the asset measurement data.

16. The apparatus of claim 15, wherein the enabling of the simulation data acquisition service deployed at the site of the real device to acquire the asset simulation data from a simulation side deployed at the site based on the asset measurement data comprises:
enabling the simulation side deployed at the site to generate a FMU and send the FMU to the simulation data acquisition service deployed at the site of the real device; or
inputting the asset measurement data to the FMU in the simulation data acquisition service to generate the asset simulation data.

* * * * *